US010508520B2

(12) United States Patent
Saleri et al.

(10) Patent No.: US 10,508,520 B2
(45) Date of Patent: Dec. 17, 2019

(54) SYSTEMS AND METHODS FOR INCREASING RECOVERY EFFICIENCY OF PETROLEUM RESERVOIRS

(71) Applicant: QRI GROUP, LLC, Houston, TX (US)

(72) Inventors: Nansen G. Saleri, Houston, TX (US); Robert M. Toronyi, Danville, CA (US); Joey D. Broussard, Houston, TX (US)

(73) Assignee: QRI GROUP, LLC, Houston, TX (US)

( * ) Notice: Subject to any disclaimer, the term of this patent is extended or adjusted under 35 U.S.C. 154(b) by 199 days.

(21) Appl. No.: 15/618,399

(22) Filed: Jun. 9, 2017

(65) Prior Publication Data
US 2017/0335665 A1    Nov. 23, 2017

Related U.S. Application Data

(63) Continuation-in-part of application No. 13/282,282, filed on Oct. 26, 2011, now Pat. No. 9,710,766.

(51) Int. Cl.
| | | |
|---|---|---|
| *E21B 41/00* | (2006.01) | |
| *E21B 43/20* | (2006.01) | |
| *E21B 47/00* | (2012.01) | |
| *E21B 43/08* | (2006.01) | |
| *E21B 43/16* | (2006.01) | |

(Continued)

(52) U.S. Cl.
CPC .......... *E21B 41/0092* (2013.01); *E21B 43/08* (2013.01); *E21B 43/168* (2013.01); *E21B 43/20* (2013.01); *E21B 47/00* (2013.01); *G01V 1/50* (2013.01); *G06Q 10/04* (2013.01); *G06Q 10/06393* (2013.01); *G06Q 10/06395* (2013.01); *G06Q 50/06* (2013.01); *E21B 49/02* (2013.01);

(Continued)

(58) Field of Classification Search
CPC .................................................. E21B 41/0092
See application file for complete search history.

(56) References Cited

U.S. PATENT DOCUMENTS

| | | |
|---|---|---|
| 3,035,440 A | 5/1962 | Reed |
| 5,984,010 A | 11/1999 | Elias et al. |

(Continued)

OTHER PUBLICATIONS

U.S. Appl. No. 14/836,564, filed Aug. 26, 2015, Mondal et al.

(Continued)

*Primary Examiner* — Matthew D Krcha
(74) *Attorney, Agent, or Firm* — Workman Nydegger

(57) ABSTRACT

Methods and systems for increasing the recovery efficiency of a petroleum reservoir. For example, a method for performing a petroleum recovery assessment to increase the recovery efficiency of a petroleum reservoir includes evaluating results associated with a reservoir management analysis for the petroleum reservoir and generating a reservoir management analysis score. The method further includes evaluating results associated with a global benchmark analysis and generating an estimated maximum recovery efficiency for the petroleum reservoir. The method further includes determining key recovery obstacles impeding the petroleum reservoir from achieving the estimated maximum recovery efficiency, and identifying field development opportunities addressing a key recovery obstacle that when implemented, increases a recovery efficiency for the petroleum reservoir closer to the estimated maximum recovery efficiency.

19 Claims, 7 Drawing Sheets

(51) Int. Cl.
| | |
|---|---|
| G06Q 10/06 | (2012.01) |
| G06Q 50/06 | (2012.01) |
| G01V 1/50 | (2006.01) |
| G06Q 10/04 | (2012.01) |
| E21B 49/02 | (2006.01) |
| E21B 49/08 | (2006.01) |

(52) U.S. Cl.
CPC ........ *E21B 49/08* (2013.01); *G01V 2210/663* (2013.01)

(56) References Cited

U.S. PATENT DOCUMENTS

| | | | |
|---|---|---|---|
| 6,101,447 | A | 8/2000 | Poe |
| 7,079,952 | B2 | 7/2006 | Thomas et al. |
| 7,289,942 | B2 | 10/2007 | Yang et al. |
| 7,445,041 | B2 | 11/2008 | O'Brien |
| 7,556,059 | B2 | 7/2009 | Arthur et al. |
| 7,798,219 | B1 | 9/2010 | Harnoy |
| 7,890,264 | B2 | 2/2011 | Elphic |
| 7,963,327 | B1 | 6/2011 | Saleri et al. |
| 8,145,427 | B1 | 3/2012 | Saleri et al. |
| 8,145,428 | B1 | 3/2012 | Saleri et al. |
| 8,195,401 | B2 | 6/2012 | Ella et al. |
| 8,209,202 | B2 | 6/2012 | Narayanan et al. |
| 8,880,422 | B1 | 11/2014 | Lehmann et al. |
| 9,710,766 | B2 | 7/2017 | Saleri et al. |
| 9,767,421 | B2 | 9/2017 | Saleri et al. |
| 2001/0015133 | A1 | 8/2001 | Sakai et al. |
| 2001/0037983 | A1 | 11/2001 | Takahashi et al. |
| 2002/0013687 | A1 | 1/2002 | Ortoleva |
| 2002/0120429 | A1 | 8/2002 | Ortoleva |
| 2003/0225606 | A1 | 12/2003 | Raghuraman et al. |
| 2004/0015376 | A1 | 1/2004 | Zhu et al. |
| 2004/0158406 | A1 | 8/2004 | Harrison |
| 2004/0220846 | A1 | 11/2004 | Cullick |
| 2005/0038603 | A1 | 2/2005 | Thomas et al. |
| 2005/0149307 | A1 | 7/2005 | Gurpiner et al. |
| 2005/0209912 | A1 | 9/2005 | Venningen et al. |
| 2006/0224369 | A1 | 10/2006 | Yang et al. |
| 2006/0289157 | A1 | 12/2006 | Rao |
| 2007/0016389 | A1 | 1/2007 | Ozgen |
| 2007/0017968 | A1 | 1/2007 | Beabes et al. |
| 2007/0028417 | A1 | 2/2007 | Crichlow |
| 2007/0143025 | A1 | 6/2007 | Valdez et al. |
| 2007/0284107 | A1 | 12/2007 | Crichlow |
| 2008/0052097 | A1 | 2/2008 | Bouzas et al. |
| 2008/0091283 | A1 | 4/2008 | Balci et al. |
| 2008/0252898 | A1 | 10/2008 | Pfaff |
| 2008/0262898 | A1 | 10/2008 | Tonchev et al. |
| 2009/0005630 | A1 | 1/2009 | Yokoyama et al. |
| 2009/0037115 | A1 | 2/2009 | Magill et al. |
| 2009/0133871 | A1 | 5/2009 | Skinner et al. |
| 2009/0313772 | A1 | 12/2009 | Talley |
| 2010/0042458 | A1 | 2/2010 | Rashid et al. |
| 2010/0057418 | A1 | 3/2010 | Li et al. |
| 2010/0082142 | A1 | 4/2010 | Usadi et al. |
| 2010/0204972 | A1 | 8/2010 | Hsu et al. |
| 2010/0300682 | A1 | 12/2010 | Thakur et al. |
| 2011/0014088 | A1 | 1/2011 | Zubrin et al. |
| 2011/0054869 | A1 | 3/2011 | Li |
| 2011/0067443 | A1 | 3/2011 | Martinez et al. |
| 2011/0168391 | A1* | 7/2011 | Saleri ............... E21B 43/00 166/250.15 |
| 2011/0290479 | A1 | 12/2011 | Izgec |
| 2011/0295656 | A1* | 12/2011 | Venkatasubramanian ............. G06Q 10/06393 705/7.39 |
| 2012/0101759 | A1 | 4/2012 | Rai et al. |
| 2012/0232865 | A1* | 9/2012 | Maucec ............... G01V 1/30 703/2 |
| 2012/0292055 | A1 | 11/2012 | Swist |
| 2013/0048279 | A1 | 2/2013 | Appel et al. |
| 2013/0110474 | A1 | 5/2013 | Saleri |
| 2013/0110524 | A1 | 5/2013 | Saleri et al. |
| 2013/0151159 | A1* | 6/2013 | Pomerantz ............ E21B 49/082 702/11 |
| 2013/0161502 | A1 | 6/2013 | Pomerantz et al. |
| 2013/0218538 | A1 | 8/2013 | Fuecker et al. |
| 2013/0338987 | A1 | 12/2013 | Cheng et al. |
| 2015/0337631 | A1 | 11/2015 | Matringe et al. |
| 2015/0346010 | A1 | 12/2015 | Matringe et al. |

OTHER PUBLICATIONS

U.S. Appl. No. 15/299,298, filed Oct. 21, 2016, Saleri et al.
U.S. Appl. No. 15/408,397, filed Jan. 17, 2016, Saleri et al.
U.S. Appl. No. 15/618,890, filed Jun. 9, 2017, Matringe et al.
Batavia, "Front-End Loading for Life Cycle Success", Offshore Technology Conference Paper No. OTC-12980; Published Apr. 2001.
BDM-Oklahoma, Inc., "Feasability Study of Heavy Oil Recovery in the United States", U.S. Department of Energy, Document No. NIPER/BDM-0225; Published Mar. 1995.
Burns et al., "Gas Field Development: Automatic Selection of Locations for New Producing Wells", Society of Petroleum Engineers, Document No. SPE-2429; Published 1969.
Cordazzo et al., "Interblock Transmissibility Calculation Analysis for Petroleum Reservoir Simulation", Federal University of Santa Catarina, Nov. 2002, pp. 1-18.
Fiksel et al., "Measuring Progress Towards Sustainability Principles, Process, and Best Practices", 1999 Greening of Industry Network Conference Best Practice Proceedings.
Freudenrich, Ph.D., Craig, and Jonathan Strickland, "How Oil Drilling Works" Apr. 12, 2001. HowStuffWorks.com retrieved from WayBack Machine, http://web.archive.org/web/20060418040616/http://science.howstuffworks.com/oil-drilling.htm/printable.
Graf et al., "Candidate Selection Using Stochastic Reasoning Driven by Surrogate Reservoir Models"; Society of Petroleum Engineers, Document No. SPE-136373; SPE Reservoir Evaluation and Engineering; Published Aug. 2011; p. 433-442.
Ham, Jerry, Ranking of Texas Reservoirs for Application of Carbon Dioxide Miscible Displacement, Apr. 1996.
Helman, "The Octopus", Forbes Energy & Genius, pp. 454-451, Nov. 24, 2008.
Investopedia.com, "What are leading, lagging, and coincident indicators? What are they for?", http://www.investopedia.com/ask/answers/177.asp, retrieved on Feb. 27, 2012.
Investorwords.com, "lagging indicator", "leading indicator", http://www.investorwords.com/2713/lagging_indicator.html, http://www.investorwords.com/2741/leading_indicator.html.
Izgec et al, "Quantifying Reservoir Connectivity, In-Place Volumes, and Drainage-Area Pressures during Primary Depletion"; Elsevier, 2009; Journal of Petroleum Science and Engineering, vol. 69; p. 7-17.
Jolley et al., Reservoir Compartmentalization: An Introduction; Reservoir Compartmentalization; The Geological Society of London, 2010; Special Publications vol. 347; pp. 1-8.
Kabir et al., "Diagnosis and Reservoir Compartmentalization from Measured Pressure/Rate Data during Primary Depletion"; Elsevier, 2009; Journal of Petroleum Science and Engineering, vol. 69, pp. 271-282.
McElroy, "Transient Pressure Analysis in Strip Reservoirs with Linear Skin Discontinuities", Stanford University, 1986, p. 1-58.
"The Report of the BP U.S. Refineries Independent Safety Review Panel", Jan. 2007.
Rivas et al., "Ranking Reservoirs for Carbon Dioxide Flooding Processes", 1994.
Saleri et al., "Data and Data Hierarchy", SPE 21369, pp. 1286-1293, Dec. 1992.
Saleri, "Dawn in the Desert: Saudi High Tech Paying Off at Ghawar", Energy Tribune, pp. 15-17, Sep. 2007.
Saleri et al., "Engineering Control in Reservoir Simulation: Parts I and II", SPE 18305, 1988.
Saleri et al., "The Expanding Role of the Drill Bit in Shaping the Subsurface", JPT, pp. 53-58, Dec. 2003.
Saleri, "Haradh III: A Milestone for Smart Fields", JPT, Nov. 2006.

(56) References Cited

OTHER PUBLICATIONS

Saleri, "'Learning' Reservoirs: Adapting to Disruptive Technologies", JPT, pp. 57-60, Mar. 2002.
Saleri, "The Next Trillion: Anticipating and Enabling Game-Changing Recoveries", JPT, Apr. 2006.
Saleri, "Reservoir Management Tenets: Why They Matter to Sustainable Supplies", JPT, pp. 28-30, Jan. 2005.
Saleri, "Reservoir Performance Forecasting: Acceleration by Parallel Planning", JPT, pp. 652-657, Jul. 1993.
Saleri et al., "Shaybah-220: A Maximum-Reservoir-Contact (MRC) Well and Its Implications for Developing Tight-Facies Reservoirs", SPE Reservoir Evaluation &.
Saleri, "Tenets and Diagnostics in Modern Reservoir Management", 8th International Forum on Reservoir Simulation, Jun. 2005, Stressa, Italy.
Sayarpour et al., "The use of capacitance-resistance models for rapid estimation of waterflood performance and optimization", Journal of Petroleum Science and Engineering, 69 (2009, 227-238).
Schlumberger.com retrieved from WayBack Machine, http://web.archive.org/web/20071230014516/http://www.slb.com/.
Slide from 2003 Presentation by Joe Ault.
Smalley et al., "Reservoir Compartmentalization Assessed with Fluid Compositional Data", Society of Petroleum Engineers, Aug. 1994; SPE Reservoir Engineering, vol. 9 Is. 3; p. 175-180.
Society of Petroleum Engineers, "Petroleum Resources Management System"; SPE/World Petroleum Council; Published Apr. 2007.
Society of Petroleum Engineers, "Guidelines for the Evaluation of Petroleum Reserves and Resources"; SPE in associate with World Petroleum Congresses and American Association of Petroleum Geologists, 2001; pp. 1-139.
Yin "Geomechanics-Reservoir Modeling by Displacement Discontinuity-Finite Element Method" University of Waterloo, 2008, p. 1-141.
U.S. Appl. No. 12/392,891, filed Feb. 25, 2009, Office Action dated Dec. 8, 2010.
U.S. Appl. No. 12/392,891, filed Feb. 25, 2009, Notice of Allowance dated Mar. 24, 2011.
U.S. Appl. No. 12/606,027, filed Oct. 26, 2009, Office Action dated Aug. 10, 2011.
U.S. Appl. No. 12/915,278, filed Oct. 29, 2010, Office Action dated Nov. 7, 2011.
U.S. Appl. No. 12/567,361, filed Sep. 25, 2009, Office Action dated Nov. 30, 2011.
U.S. Appl. No. 12/567,404, filed Sep. 29, 2009, Office Action dated Dec. 8, 2011.
U.S. Appl. No. 12/606,027, filed Oct. 26, 2009, Final Office Action dated Jan. 19, 2012.
U.S. Appl. No. 12/567,361, filed Sep. 25, 2009, Notice of Allowance dated Feb. 2, 2012.
U.S. Appl. No. 12/567,404, filed Sep. 25, 2009, Notice of Allowance dated Feb. 7, 2012.
U.S. Appl. No. 12/915,278, filed Oct. 29, 2010, Final Office Action dated Mar. 1, 2012.
U.S. Appl. No. 13/282,297, filed Oct. 26, 2011, Office Action dated Apr. 1, 2013.
U.S. Appl. No. 13/282,297, filed Oct. 26, 2011, Final Office Action dated Sep. 11, 2013.
U.S. Appl. No. 13/282,297, filed Oct. 26, 2011, Advisory Action dated Nov. 18, 2013.
U.S. Appl. No. 13/282,282, filed Oct. 26, 2011, Office Action dated Mar. 27, 2014.
U.S. Appl. No. 13/282,315, filed Oct. 26, 2011, Office Action dated Aug. 18, 2014.
U.S. Appl. No. 13/282,272, filed Oct. 26, 2011, Office Action dated Nov. 7, 2014.
U.S. Appl. No. 13/282,282, filed Oct. 26, 2011, Final Office Action dated Dec. 26, 2014.
U.S. Appl. No. 13/282,315, filed Oct. 26, 2011, Office Action dated Feb. 18, 2015.
U.S. Appl. No. 13/282,297, filed Oct. 26, 2011, Office Action dated Mar. 16, 2015.
U.S. Appl. No. 13/282,282, filed Oct. 26, 2011, Office Action dated May 11, 2015.
U.S. Appl. No. 13/282,315, filed Oct. 26, 2011, Final Office Action dated Jun. 25, 2015.
U.S. Appl. No. 13/282,282, filed Oct. 26, 2011, Office Action dated Nov. 20, 2015.
U.S. Appl. No. 13/282,282, filed Oct. 26, 2011, Notice of References cited dated Nov. 30, 2015.
U.S. Appl. No. 13/282,272, filed Oct. 26, 2011, Final Office Action dated Dec. 9, 2015.
U.S. Appl. No. 13/282,297, filed Oct. 26, 2011, Final Office Action dated Dec. 30, 2015.
U.S. Appl. No. 13/282,315, filed Oct. 26, 2011, Office Action dated Mar. 9, 2016.
U.S. Appl. No. 13/282,272, filed Oct. 26, 2011, Office Action dated May 19, 2016.
U.S. Appl. No. 13/282,272, filed Oct. 26, 2011, Final Office Action dated Aug. 23, 2016.
U.S. Appl. No. 13/282,315, filed Oct. 26, 2011, Final Office Action dated Sep. 14, 2016.
U.S. Appl. No. 13/282,297, filed Oct. 26, 2011, Office Action dated Oct. 12, 2016.
U.S. Appl. No. 13/282,282, filed Oct. 26, 2011, Final Office Action dated Nov. 14, 2016.
U.S. Appl. No. 13/282,282, filed Oct. 26, 2011, Notice of Allowance dated Apr. 11, 2017.
U.S. Appl. No. 14/604,367, filed Jan. 23, 2015, Office Action dated Jun. 16, 2017.
U.S. Appl. No. 14/604,330, filed Jan. 23, 2015, Office Action dated Jun. 30, 2017.
U.S. Appl. No. 15/299,828, filed Oct. 21, 2016, Office Action dated Aug. 17, 2017.
U.S. Appl. No. 14/604,367, filed Jan. 23, 2015, Final Office Action dated Sep. 21, 2017.

* cited by examiner

SYSTEMS AND METHODS FOR INCREASING RECOVERY EFFICIENCY OF PETROLEUM RESERVOIRS

CROSS REFERENCE TO RELATED APPLICATIONS

This application is a continuation-in-part of U.S. patent application Ser. No. 13/282,282 filed Oct. 26, 2011, entitled "IDENTIFYING FIELD DEVELOPMENT OPPORTUNITIES FOR INCREASING RECOVERY EFFICIENCY OF PETROLEUM RESERVOIRS," the disclosure of which is incorporated herein in its entirety.

BACKGROUND OF THE INVENTION

The Field of the Invention

The invention is in the field of petroleum producing field management, more particularly in the field of identifying and implementing field development opportunities to increase production from a petroleum reservoir.

The Relevant Technology

Petroleum is the lifeblood of modern industrialized society. Petroleum is extracted from petroleum reservoirs and refined into myriad products, including fuel for use powering combustion engines (e.g., diesel fuel, jet fuel, and octane) or providing heat (e.g., kerosene). Additionally, olefinic and paraffinic hydrocarbons are generated during the refining process, and these compounds are foundational in the manufacturing of many plastics. Because of its utility and rich potential, there is a continual demand for petroleum. However, extracting and refining petroleum is a tremendously time and resource intensive process. Due to a variety of technical and geological obstacles, it is difficult, if not entirely improbable, to recover all of the petroleum contained in a reservoir. Even with advances in drilling and extraction technologies, the average recovery from a petroleum reservoir is about 35% of the available petroleum. While this represents a significant increase in the average petroleum recovery in recent years, it also means that about 65% of the petroleum found in a typical reservoir remains unrecovered from an economic and/or technical standpoint.

With regard to reservoir productivity, operators typically analyze each individual well to determine the rate of petroleum extraction, or well productivity. However, operators often fail to appreciate the complexities and interrelated effects each well has with respect to aggregate productivity for an entire reservoir and/or oil field and often cannot evaluate well activity and productivity across a plurality of reservoirs or oil fields.

Given the high cost of exploration, dwindling opportunities to find new petroleum reservoirs, and the rising cost of petroleum as a commodity, there is a need to increase both short-term and long-term production across petroleum reservoirs. Despite the foregoing and the obvious benefits of increasing recovery, a majority of petroleum in a typical reservoir remains unrecovered, and there currently does not exist a practical and/or predictable way of efficiently increasing petroleum recovery at these sites.

In some cases, the technology exists to increase the current production and/or increase the total long-term recovery of a petroleum reservoir. However, the technology cannot be efficiently implemented in an intelligent, long-term plan for maximizing output, extending the life of each reservoir, and/or increasing the total recovery across reservoirs as it is difficult to determine where and how limited resources should be focused for optimal production. For example, while a particular reservoir may underperform relative to other reservoirs, which might lead some to neglect further development of the reservoir, the reservoir may, in fact, contain much larger quantities of recoverable petroleum but be under-producing simply due to poor management. Many petroleum reservoirs are unique, and accordingly, it is difficult to provide a single extraction solution that is optimum for all reservoirs. Furthermore, resources may be wasted cultivating some reservoirs in which the production gains achieved are disproportionately small compared to the developmental resources expended. The inability to properly identify which reservoir(s) to focus further development and resources and, further, the inability to identify how and when to implement/augment reservoir infrastructure or the recovery process results in diminished short-term productivity and reduced long-term recovery across petroleum reservoirs.

In general, those who operate petroleum production fields typically formulate a recovery strategy for an oil field and/or reservoir(s) prior to petroleum extraction. For example, an operator can determine how to drill, the number of wells to drill, the well placement, the production techniques to use (e.g., material injection), etc. However, once the initial recovery strategy is implemented, operators tend to focus on well maintenance, including implementation of the latest technologies for maximizing well output at the reservoir. Consequently, operators often fail to reassess a recovery strategy based on changed circumstances over time and often fail to appreciate aggregate well activity, such as, for example, failing to consider the total health and longevity of an oil field and how an oil field performs relative to other oil fields—both on a short-term and on a long-term basis. This limits an operator's ability to identify subsequent development opportunities for increasing and/or maximizing recovery efficiency. For example, it can be difficult to identify and implement subsequent, efficient actions that can be taken in active fields to increase petroleum production.

Accordingly, there is an ongoing need for improved systems and methods for increasing the recovery efficiency of petroleum reservoirs and/or oil fields.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present disclosure include systems and methods for increasing the recovery efficiency of petroleum reservoirs. For example, a method for performing a recovery design assessment to increase the recovery efficiency of a petroleum reservoir includes analyzing data relating to a plurality of categories of reservoir management effectiveness for the petroleum reservoir, analyzing data relating to a relative weighting for each of the plurality of categories of reservoir management effectiveness, and based on the plurality of categories of reservoir management effectiveness and the relative weighting of each of the plurality of categories of reservoir management effectiveness, generating a reservoir management rating for the petroleum reservoir. The method further includes determining a compartmentalization factor based on compartmentalization data for the petroleum reservoir, determining a transmissibility index based on transmissibility data for the petroleum reservoir, determining a depth factor based on depth data for the petroleum reservoir, and based on the compartmentalization factor, the transmissibility index, and the depth factor, generating a geo-technical index for the petroleum reservoir. The method further includes generating an estimated ultimate recovery factor based at least in part on a plurality of reservoirs making use of reservoir management best practices and increased technology, and based at least in part on the geo-technical index and the estimated ultimate recovery factor, determining an estimated maximum recovery for the petroleum reservoir. The method further includes determining one or more key recovery obstacles impeding the petroleum reservoir from achieving the estimated maximum recovery efficiency based at least in part on the reservoir management rating and the estimated maximum recovery for the petroleum reservoir, and identifying one or more field development opportunities addressing the one or more key recovery obstacles. In one embodiment, the method further includes implementing at least one field development opportunity selected from the one or more field development opportunities to increase the recovery efficiency of the petroleum reservoir.

Computer systems are also disclosed. For example, an exemplary computer system comprises one or more processors and one or more computer-readable storage media having stored thereon computer-executable instructions. The computer-executable instructions are executable by the one or more processors to cause the computer system to perform a petroleum recovery assessment for a petroleum reservoir by causing the computer system to perform a series of steps, including at least the following: evaluate results associated with a reservoir management analysis for the petroleum reservoir, generate a reservoir management analysis score based on the evaluated results associated with the reservoir management analysis, evaluate results associated with a global benchmark analysis, generate an estimated maximum recovery efficiency for the petroleum reservoir based on the evaluated results associated with the global benchmark analysis, determine one or more key recovery obstacles impeding the petroleum reservoir from achieving the estimated maximum recovery efficiency based at least in part from the reservoir management score and the estimated maximum recovery efficiency, and identify one or more field development opportunities addressing at least one of the one or more key recovery obstacles that when implemented, increase a recovery efficiency for the petroleum reservoir closer to the estimated maximum recovery efficiency.

These and other advantages and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof, which are illustrated in the appended drawings. It is appreciated that these drawings depict only illustrated embodiments of the invention and are therefore not to be considered limiting of its scope. The invention will be described and explained with additional specificity and detail using the accompanying drawings in which.

DETAILED DESCRIPTION

Introduction

Figure 1:
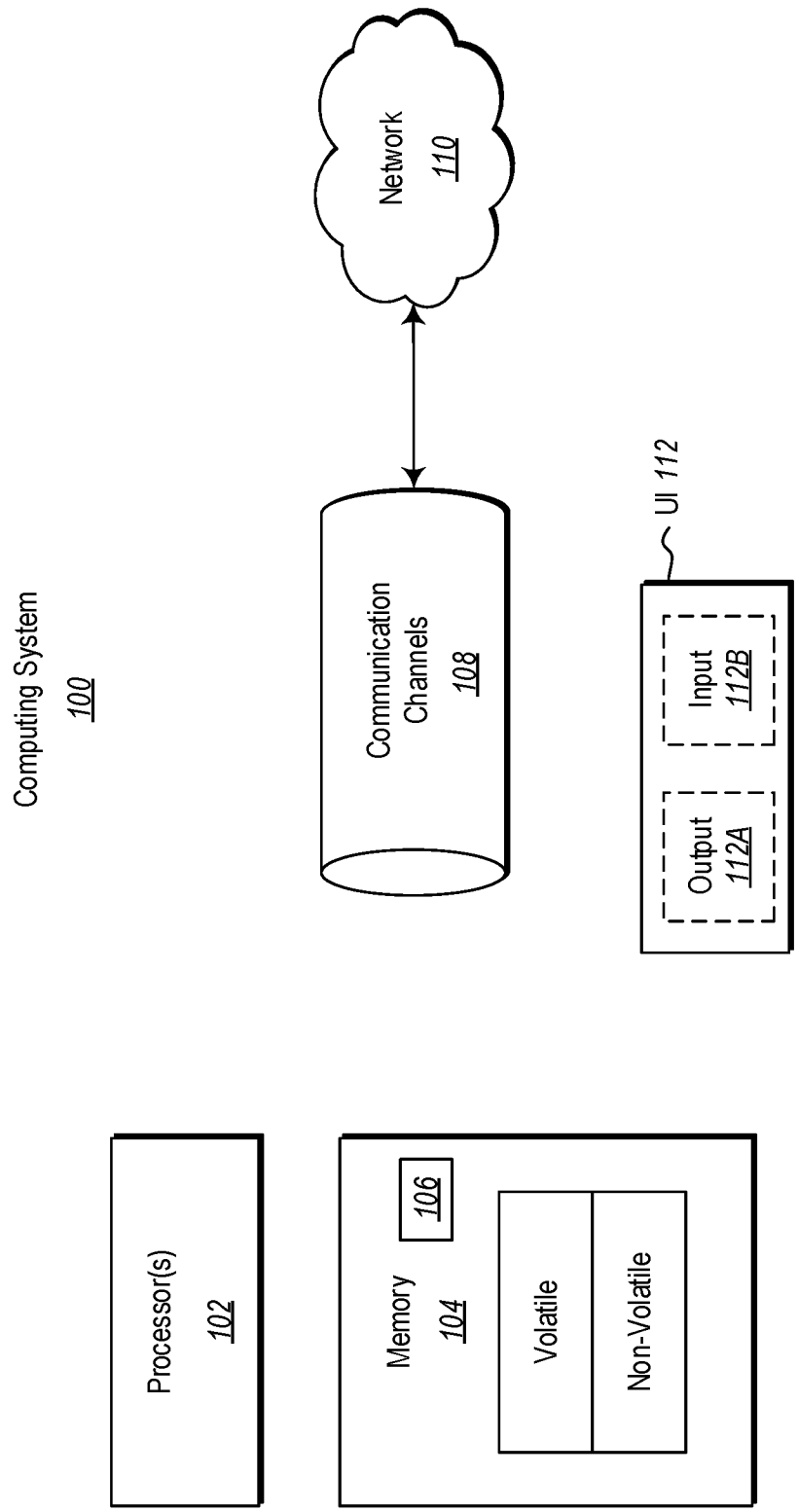
FIG. 1 schematically illustrates an exemplary computing system.

Extracting and refining petroleum from a petroleum reservoir is a highly technical and tremendously time and resource intensive process fraught with difficulties and inefficiencies. For example, it is difficult to understand the complex interrelationship between the geological, spatial, and physical characteristics that define the reservoir, itself, along with the effects of petroleum extraction on the reservoir, and it is additionally difficult to reliably and accurately identify recovery obstacles and opportunities for mediating those recovery obstacles to promote increased recovery efficiency.

A petroleum reservoir can be described as a set of geological, spatial, and physical characteristics that, when viewed as a whole, illustrate a non-uniform geo-physical space that is likely different in many respects to any other reservoir known or described. In other words, petroleum reservoirs are essentially unique from one another, so implementing industry "best practices"—which are often formed from generalizations that are based on common characteristics shared between a subset of known reservoirs—is unlikely to yield a maximized petroleum recovery efficiency at all reservoirs, particularly over the life of production. The complexity of the geo-spatial characteristics defining reservoirs is exacerbated by implementation of one or more suboptimal operational attributes over the life of production. As a generalized and simplified example, the extraction process often affects the properties of the petroleum remaining in the reservoir in addition to the physical characteristics of the reservoir, itself. The fluid permeability within the reservoir, for example, may be affected, which can result in coning and negatively impact the efficient extraction of petroleum products at the reservoir—from both a short-term and a long-term perspective. In this way, the changing geo-spatial characteristics of the reservoir rendered what may have previously been an optimal operational attribute into a sub-optimal operational attribute to decrease petroleum recovery efficiency.

Thus, because the geo-physical characteristics of the reservoir are unique and because these characteristics may be complicated by management practices at the reservoir, recovery inefficiencies are observed. It is difficult to determine when such a reduction in recovery efficiency will occur and what aspect of the infrastructure of a petroleum producing field or with a petroleum recovery process should be augmented to address and recovery from the inefficiency. Even industry "best practices" fall short and fail to address the foregoing difficulties and inefficiencies.

Petroleum recovery assessments can alleviate the foregoing difficulties and promote an increase in petroleum recovery efficiency. Embodiments of this disclosure include systems, methods, and computer program products for performing a petroleum recovery assessment for a petroleum reservoir. As used herein, the term "petroleum recovery assessment" broadly describes any process or methodology that performs one or more of: characterizing the recovery state of a petroleum reservoir, identifying potential recovery efficiencies (e.g., key recovery obstacles (KROs)) available at the petroleum reservoir, and further identifying field development opportunities (FDOs) that, when implemented, result in increased petroleum production and/or increased petroleum recovery efficiency. It should be appreciated that a petroleum recovery assessment is not limited in application to a petroleum reservoir but can be more broadly implemented at scale (e.g., for a petroleum producing field).

An exemplary petroleum recovery assessment includes the "Recovery Design Assessment™", or "RDA™." An RDA™ is designed to assess the potential of unlocking additional petroleum production from petroleum reservoirs and includes systematic methodologies for accurately identifying site-specific FDOs that take into consideration, among other things, a global benchmark analysis and reservoir management effectiveness to increase petroleum production and/or increase petroleum recovery efficiency. RDA™ (and other petroleum recovery assessments) enables engineers, managers, operators, interested parties, and others to efficiently and accurately identify and implement new development opportunities for increasing the short-term and/or long-term petroleum production of existing reservoirs (and petroleum producing fields).

In some embodiments, an RDA™ takes into consideration a global benchmark analysis (such as the Geo-Technical Index™ or GTI™) and a reservoir management analysis (such as the Reservoir Management Rating™) to identify KROs, and, in turn, FDOs to address the KROs. The global benchmark analysis can include comparing a GTI™ for a petroleum producing field of interest to an Estimated Ultimate Recovery Factor (EURF) for benchmark fields worldwide to determine the ideal recovery efficiency for a given petroleum reservoir (or petroleum producing field, where applicable).

A petroleum recovery assessment can additionally include weighting of data to, for example, provide a more accurate assessment of reservoir characteristics and production. This can prove advantageous when modeling characteristics of a given reservoir and determining, for example, an estimated maximum recovery for a reservoir. In some embodiments, weighting data can assist in determining outlier data points. Outlier data points may simply be anomalies that can be ignored or minimized. However, in other embodiments, outlier data points can demonstrate one or more specific regions of the reservoir where an ideal combination of infrastructure and recovery processes resulted in a higher than expected recovery efficiency. Proper weighting of data can result in a higher fidelity identification of less productive regions of the reservoir that may need improvement and, consequently, the selection of field development opportunities that maximize recovery efficiency.

Recovery Design Assessment™ can be used in conjunction with, and as an important component of, a larger, more comprehensive system for assessing petroleum reservoir competency. One example of a larger, more comprehensive system developed by the inventors is known as Reservoir Competency Asymmetric Assessment™ (or RCAA™), a description of which is set forth in U.S. Pat. No. 7,963,327, issued Jun. 21, 2011, and entitled "METHOD FOR DYNAMICALLY ASSESSING PETROLEUM RESERVOIR COMPETENCY AND INCREASING PRODUCTION AND RECOVERY THROUGH ASYMMETRIC ANALYSIS OF PERFORMANCE METRICS," which is incorporated herein in its entirety by reference.

By way of background, RCAA™ includes several closely interrelated sub-methods or modules that are employed in concert and/or sequentially. These methods or modules can be used in forming metrics and indicators regarding petroleum reserves that are used as part of a petroleum recovery assessment (e.g., RDA™), and knowledge gained as part of the petroleum recovery assessment can be further applied to an iterative application of the RCAA™ of the petroleum reserves. The methods or modules are (i) analyzing and diagnosing the specific set of features of a reservoir using targeted metrics, of which the petroleum recovery assessment, and particularly, the RDA™, can be added or modified so as to function as one of the components, (ii) designing a recovery plan for maximizing or increasing current production and ultimate recovery (e.g., increasing recoverable petroleum reserves) from a petroleum reservoir, (iii) implementing the recovery plan so as to increase current production and ultimate recovery of petroleum from the reservoir, and (iv) monitoring or tracking the performance of the petroleum reservoir using targeted metrics and making adjustments to production parameters, as necessary, to maintain desired productivity and recovery.

Generally speaking, petroleum recovery assessments and RCAA™ each rely on intense knowledge gathering techniques, which can include taking direct measurements of the physics, geology, and other conditions, characteristics, and/or other aspects of the reservoir and, where applicable, considering the type, number, location and/or efficacy of any wells that are servicing, or otherwise associated with, the reservoir (e.g., producing wells, dead wells, and observation wells); analyzing the present condition or state of the reservoir using asymmetric weighting of different metrics; and prognosticating future production, recovery, and other variables based on a comprehensive understanding of the specific set of features making up the reservoir coupled with the asymmetric weighting and analysis of the data. In some cases, the gathered information may relate to measurements and data generated by others (e.g., the reservoir manager or sensors provided at the reservoir, itself).

In general, RCAA™ can also be broadly understood as an assessment process that guides both the planning and implementation phases of petroleum recovery. Most hydrocarbon assets (e.g., petroleum reservoirs) have a set of characteristics reflective of their subsurface and surface features. RCAA™ enables the development and application of extraction methods that are optimally designed to the particular set of features found at each hydrocarbon asset. One advantage of RCAA™ is that it directs the realization of incremental barrels of reserves and production over and above levels being achieved using standard industry techniques. This, in turn, may reduce long-term capital and operating expenses while concomitantly increasing short-term and/or long-term production.

According to one embodiment, implementation of RCAA™ spans six interweaving and interdependent tracks: i) Knowledge Systems; ii) Q6 Surveys; iii) Deep Insight Workshops; iv) Q-Diagnostics; v) Gap Analysis; and vi) Plan of Action. The information gathered from these tracks is integrated using modern knowledge-sharing mediums including web-based systems and communities of practice. While the overall business model of RCAA™ includes both technological and non-technological means for gathering the relevant information, the method cannot be implemented without the use of physical processes and machinery for gathering key information. Moreover, implementing a plan of action involves computerized monitoring of well activity, and enhanced reservoir performance results in a physical transformation of the reservoir itself. For example, once a plan of action is implemented and production and/or recovery from the reservoir are increased, the reservoir is physically transformed from a lower producing to a higher producing asset.

Petroleum recovery assessments, such as RDA™, similarly involve physical processes and machinery for gathering key information. Converting the gathered information, which relates to both the set of common and unique features defining the reservoir as well to the operational attributes of the petroleum recovery plan governing extraction of petroleum from the reservoir, through a petroleum recovery assessment is a transformation of essentially physical data into actionable insights (e.g., FDOs) that, when implemented, increase the recovery efficiency of a reservoir. Additionally, implementation of the FDOs derived from the petroleum recovery assessment often results in a physical transformation of the reservoir/field infrastructure. For example, a petroleum recovery assessment can require drilling new wells and/or halting petroleum recovery of existing wells.

Additionally, implementation of the FDOs derived from the petroleum recovery assessment results in increased recovery efficiency. The increase in recovery efficiency can be measured, for example, as an increase in the total barrels of oil per day generated at one or more wells of the targeted reservoir. At the very least, this demonstrates a tangible, short-term increase in recovery efficiency. Additionally, or alternatively, implementation of FDOs derived from the petroleum recovery assessment can sustain a production plateau for a longer period of time, thereby increasing the recovery efficiency of the reservoir because absent the implemented FDO, the reservoir would yield less petroleum due to the onset of inefficient production (and consequently a reduction and/or shut down of the well) at an earlier time.

In simplified terms, extracting petroleum from a petroleum reservoir is a highly technical process fraught with technical problems. As illustrated above, recovery inefficiencies often go unnoticed and are difficult to detect. Further, even if the recovery inefficiency is known, it is difficult to determine effective remedial steps to provide an increase in recovery efficiency. In part, the geological, spatial, and physical complexities and individual identities of petroleum reservoirs make it technically difficult to identify what recovery processes and/or physical infrastructure elements should be implemented, where they should be implemented, when they should be implemented, and/or how they should be augmented to increase the recovery efficiency of a reservoir. Petroleum recovery assessments disclosed herein provide technical solutions to the foregoing technical problems, the results of which are increased recovery efficiency.

Accordingly, implementations of the present disclosure increase the recovery efficiency of reservoirs and petroleum producing fields. In some embodiments, the increased recovery efficiencies are realized by identifying KROs that impede the maximum recovery efficiency of a given reservoir and by further identifying, and in some cases automatically implementing, FDOs that eliminate or otherwise address an associated KRO. For example, performing a petroleum recovery assessment, as provided herein, may result in the identification of coning in all wells that has resulted in an uneven aquifer advance and poor sweep efficiency with large volumes of movable oil remaining bypassed (a technical problem). The petroleum recovery assessment may further determine that a combination of drilling new wells and maintaining a strict drawdown control on all wells together with wells producing on a cyclic program will increase the recovery efficiency (a technical solution). To emphasize the foregoing, the petroleum recovery assessment provides actionable insights, and in some cases directly implements the field development opportunities, to produce tangible increases in the recovery efficiency of a reservoir. This directly translates into a higher percentage of petroleum that can be extracted from a given reservoir.

Petroleum recovery assessments, thereby, promote the identification and selection of FDOs (e.g., more optimum recovery processes, additions or augmentations to infrastructure elements, etc.) more accurately and more reliably over what is otherwise possible with traditional static methods of recovery optimization. Additionally, petroleum recovery assessments provided in the present disclosure can forecast estimated maximum recovery efficiencies and additional future measures that can be taken to maintain and/or increase recovery efficiency as the reservoir ages and/or as the characteristics of the reservoir change over time.

In some embodiments, the petroleum recovery assessment is being constantly (or periodically) informed of changes and/or characteristics of the reservoir and associated petroleum production and can automatically identify and implement recovery process FDOs to iteratively increase recovery efficiency or otherwise maintain maximum recovery efficiency. This provides a technical benefit of increasing the production of a reservoir over the short and/or long term and further streamlines petroleum production. When implemented on a computing system, the petroleum recovery assessment allows for continual (or periodic) optimization of reservoir production and decreases user error.

Computing Systems for Performing a Petroleum Recovery Assessment to Increase Recovery Efficiency of a Petroleum Reservoir Some of the methods disclosed herein are implemented by one or more computing systems. It will be appreciated that computing systems are increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computer system" or "computing system" is defined broadly as including any device or system—or combination thereof—that includes at least one physical and tangible processor and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. The computing system 100 may be a standalone or distributed system. If the computing system is distributed, the processing, memory, and/or storage capability may be distributed as well.

Any number and/or type of general purpose or special purpose computing systems described above can be configured to store a database or a plurality of databases. For example, the database(s) may be stored in the memory 104 of computing system 100, and for the purpose of this disclosure, any general purpose or special purpose computer storing at least a portion of one or more databases will be generally referred to as a database server. It should be appreciated, however, that the term "database server" as used herein should also be understood to include the back-end system of a database application that performs tasks such as data analysis, storage, data manipulation, archiving, and other non-user specific tasks.

The computing system 100 also has thereon multiple structures often referred to as an "executable component." For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed by one or more processors on the computing system, whether such an executable component exists in the heap of a computing system, or whether the executable component exists on computer-readable storage media.

The structure of the executable component exists on a computer-readable medium in such a form that it is operable, when executed by one or more processors of the computing system, to cause the computing system to perform one or more function, such as the functions and methods described herein. Such a structure may be computer-readable directly by the processors—as is the case if the executable component were binary. Alternatively, the structure may be structured to be interpretable and/or compiled—whether in a single stage or in multiple stages—so as to generate such binary that is directly interpretable by the processors. Such an understanding of exemplary structures of an executable component is well within the understanding of one of ordinary skill in the art of computing when using the term "executable component."

The term "executable component" is also well understood by one of ordinary skill as including structures that are implemented exclusively or near-exclusively in hardware, such as within a field programmable gate array (FPGA), an application specific integrated circuit (ASIC), Program-specific Standard Products (ASSPs), System-on-a-chip systems (SOCs), Complex Programmable Logic Devices (CPLDs), or any other specialized circuit. Accordingly, the term "executable component" is a term for a structure that is well understood by those of ordinary skill in the art of computing, whether implemented in software, hardware, or a combination. In this description, the terms "component," "service," "engine," "module," "control," "generator," or the like may also be used. As used in this description and in this case, these terms—whether expressed with or without a modifying clause—are also intended to be synonymous with the term "executable component," and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse or other pointer input, sensors of any type, and so forth.

Accordingly, embodiments described herein may comprise or utilize a special purpose or general-purpose computing system. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example—not limitation—embodiments of the invention can comprise at least two distinctly different kinds of computer-readable media: storage media and transmission media.

Computer-readable storage media include RAM, ROM, EEPROM, solid state drives ("SSDs"), flash memory, phase-change memory ("PCM"), CD-ROM or other optical disk storage, magnetic disk storage or other magnetic storage devices, or any other physical and tangible storage medium which can be used to store desired program code in the form of computer-executable instructions or data structures and which can be accessed and executed by a general purpose or special purpose computing system to implement the disclosed functionality of the invention.

Transmission media can include a network and/or data links which can be used to carry desired program code in the form of computer-executable instructions or data structures and which can be accessed and executed by a general purpose or special purpose computing system. Combinations of the above should also be included within the scope of computer-readable media.

Further, upon reaching various computing system components, program code in the form of computer-executable instructions or data structures can be transferred automatically from transmission media to storage media (or vice versa). For example, computer-executable instructions or data structures received over a network or data link can be buffered in RAM within a network interface module (e.g., a "NIC") and then eventually transferred to computing system RAM and/or to less volatile storage media at a computing system. Thus, it should be understood that storage media can be included in computing system components that also—or even primarily—utilize transmission media.

Although the subject matter described herein is provided in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, tablets, mobile telephones, PDAs, pagers, routers, switches, datacenters, wearables (e.g., glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud-computing model can be composed of various characteristics, such as on-demand self-service, broad network access, resource pooling, rapid elasticity, measured service, and so forth. A cloud-computing model may also come in the form of various service models such as, for example, Software as a Service ("SaaS"), Platform as a Service ("PaaS"), and Infrastructure as a Service ("IaaS"). The cloud-computing model may also be deployed using different deployment models such as private cloud, community cloud, public cloud, hybrid cloud, and so forth.

Figure 2:
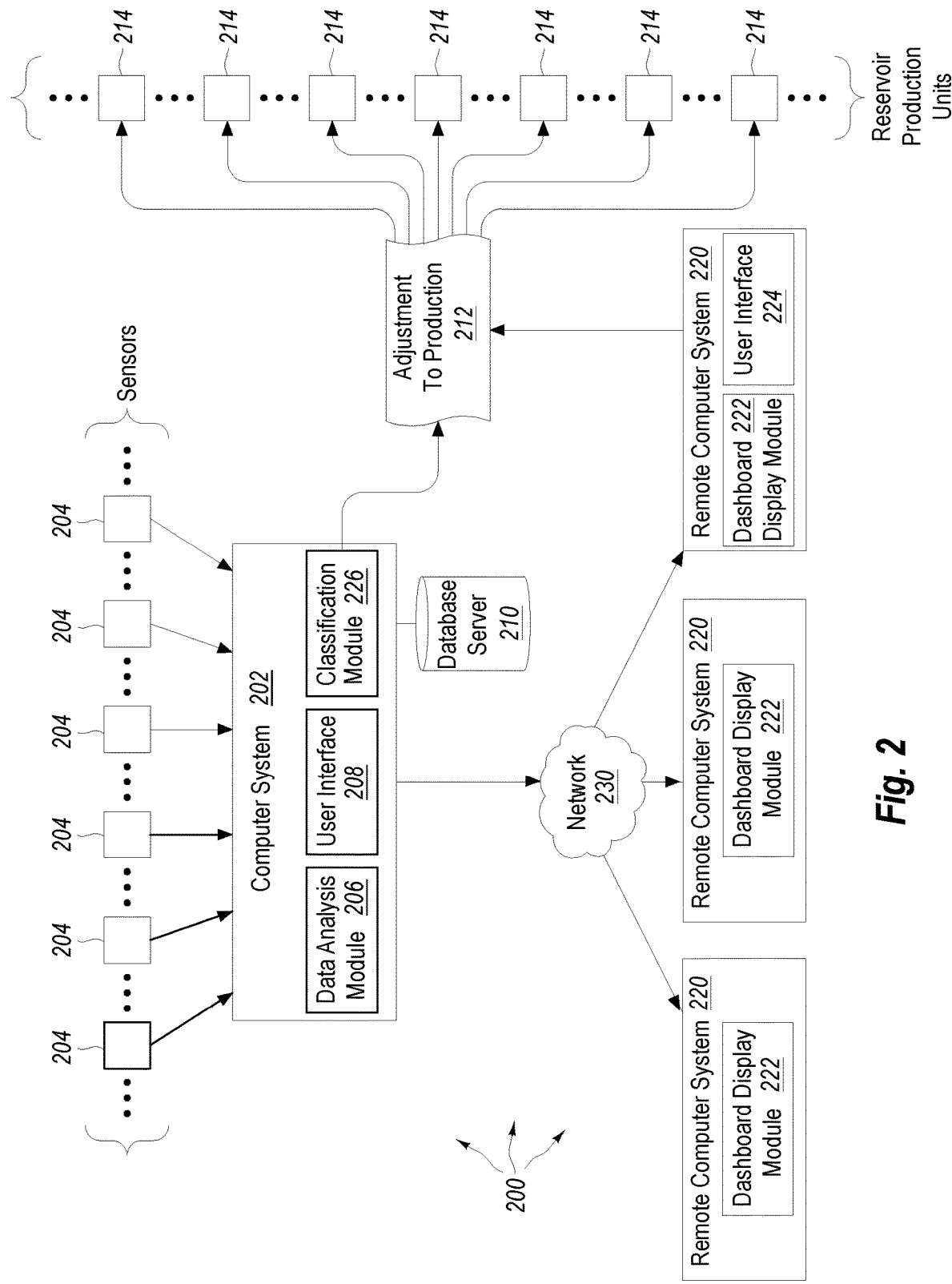
FIG. 2 illustrates a schematic of exemplary computer-implemented or computer-controlled architectures that receive, analyze, and/or display data gathered from and/or about a petroleum reservoir.

In some embodiments, a petroleum recovery assessment is implemented on a computing system, such as the computing system 100 illustrated in FIG. 1. Such computing system(s) 100 can be incorporated into a reservoir monitoring and analysis system, similar to the system 200 depicted in FIG. 2. Referring now to FIG. 2, illustrated is an exemplary computer-implemented monitoring and analysis system 200 that monitors reservoir performance, analyzes information regarding reservoir performance, displays dashboard metrics, performs petroleum recovery assessments, and optionally provides for computer-controlled modifications of reservoir production units (e.g., oil wells) to maintain optimal reservoir performance, generally, and in some embodiments to maintain optimal performance of one or more reservoir production units, individually.

In some embodiments, the monitoring and analysis system 200 is configured to monitor the performance of the reservoir before, during, and/or after implementation of an extraction plan. As described in additional detail below, the monitoring and analysis systems 200 can involve the use of computer systems 202 that receive, analyze, and/or display relevant data. Examples of metrics that can be monitored include reservoir pressure and fluid saturations and changes with logging devices, well productivity and drawdown with logging devices, fluid profile in production and injection wells with logging devices, and oil, gas, and water production and injection rates. Each computer system 202 typically includes at least one processor and system memory, similar to the computing system 100 described above with reference to FIG. 1.

In some embodiments, the computer system 202 is located at a remote location and receives data and/or metrics about the reservoir of interest directly or indirectly from infrastructure elements at the reservoir (e.g., sensors 204, a computing system located at the reservoir, etc.) and/or onsite personnel who forward the reservoir data to the computer system 202 over one or more networks. In some embodiments, the computer system 202 is located at or near a reservoir and is linked to one or more sensors 204 (via a wired or wireless connection, as known in the art). In some embodiments, the computer system 202 comprises a plurality of networked computers (e.g., each of which is designed to analyze a subset of the overall data generated by and received from the sensors 204).

In some embodiments, the sensors 204 are positioned at the reservoir and are located in and/or around a reservoir production unit 214. It should be appreciated that the sensors 204 are, in some embodiments, surface sensors, sub-surface sensors, and/or combinations thereof. In some embodiments, the sensors 204 are additionally, or alternatively, positioned at water injection wells, observation wells, etc. The data gathered by the sensors 204 (or otherwise input at and/or received by computer system 202 from other sources, such as onsite personnel) is used to generate, among other things, performance metrics (e.g., leading and lagging indicators of production and recovery), including those metrics which relate to or are incorporated by a petroleum recovery assessment. The computer system 202 may, therefore, include a data analysis module 206 programmed to establish reservoir metrics from the received data. A user interface 208 of the computer system 202 provides interactivity with a user, including the ability to receive input data from a user. Exemplary data received from a user at the user interface 208 can include or relate to a real displacement efficiency, vertical displacement efficiency, pore displacement efficiency, or other metrics and/or data known by the user and relevant to the reservoir and/or to a petroleum recovery assessment being implemented thereon.

Database server 210 can be used for long term storage of received data and can also be used to store any and/or all of the metrics generated from the data, including KROs, FDOs, petroleum recovery assessment results (e.g., RDA™ results), recovery potential indicators (e.g., GTIs™), EURFs, reservoir management analysis results (e.g., RMR™ results), RCAA™ results, and/or other data relating to the reservoir production units, the reservoir, itself, and/or the petroleum producing field comprising the reservoir.

In some embodiments, the computer system 202 can directly or indirectly communicate with infrastructure elements and/or adjust operating procedures to implement an adjustment to production 212 by reservoir production units 214 (e.g., producing oil wells, water injection wells, gas injection wells, heat injectors, and the like, and sub-components thereof). Adjustments to production 212 include, for example, changes in production volume, pressure, temperature, and/or well bore path (e.g., via closing or opening of well bore branches). In some embodiments, the adjustments to production 212 are based on or related to FDOs identified by the computer system 202 when performing a petroleum recovery assessment. The adjustments to production 212 can be implemented automatically by computer system 202, a remote computer system 220, or they can be implemented after receiving approval through the user interface 208. It should be appreciated, however, that in some embodiments, adjustments to production 212 can be implemented manually by a user at the computer system 202, at a remote computer system (e.g., at a dashboard display module 222), and/or the adjustments to production can be manually implemented at the reservoir production units 214, themselves. In some embodiments, the computer system 202 includes alarm levels or triggers that, when certain conditions are met, provide for automatic adjustments to production 212.

It should be appreciated that some adjustments to production can be implemented directly or indirectly by one or more elements of the monitoring and analysis system 200 of FIG. 2 while other adjustments to production cannot be implemented thereby. For example, many adjustments to the infrastructure of the reservoir (or reservoir production units, individually) cannot be implemented by a monitoring and analysis system but must be physically implemented. Some examples include drilling a new well or upgrading/exchanging physical pieces of the reservoir production unit, like a pump, actuator, sensor, etc. Accordingly, the computer system 202 of FIG. 2 can be configured, in many embodiments, to implement FDOs or other adjustments to production as a result of a petroleum recovery assessment; however, FDOs (or other adjustments to production) calling for a physical change in equipment or additional infrastructure elements will often require manual implementation at the reservoir and cannot be implemented directly by computer system 202. Nonetheless, as indicated above, the computer system 202 and/or one or more remote computer systems 220 can be configured to report the necessary manual adjustments to production via user interface 208, 224 and/or dashboard display module 222.

In some embodiments, the monitoring and analysis system 200 includes one or more remote computers 220 that permit a user, a team of users, or multiple parties to access information generated by main computer system 202, such as the results of a petroleum recovery assessment. For example, each remote computer 220 may include a dashboard display module 222 that renders and displays dashboards, metrics, KROs, FDOs, and/or other information relating to reservoir production and efficiency. As alluded to above, each remote computer 220 may also include a user interface 224 that permits a user to make adjustment to production 212 at reservoir production units 214. Each remote computer 220 may also include a separate database server (not shown).

Individual computer systems within the monitoring and analysis system 200 (e.g., main computer system 202 and remote computers 220) can be connected to a network 230, such as, for example, a local area network, a wide area network, or even the Internet. The various components can receive and send data to each other, as well as other components connected to the network. Networked computer systems and computers themselves constitute a "computer system" for purposes of this disclosure.

Networks facilitating communication between computer systems and other electronic devices can utilize any of a wide range of (potentially interoperating) protocols including, but not limited to, the IEEE 802 suite of wireless protocols, Radio Frequency Identification ("RFID") protocols, ultrasound protocols, infrared protocols, cellular protocols, one-way and two-way wireless paging protocols, Global Positioning System ("GPS") protocols, wired and wireless broadband protocols, ultra-wideband "mesh" protocols, etc. Accordingly, computer systems and other devices can create message related data and exchange message related data (e.g., Internet Protocol ("IP") datagrams and other higher layer protocols that utilize IP datagrams, such as, Transmission Control Protocol ("TCP"), Remote Desktop Protocol ("RDP"), Hypertext Transfer Protocol ("HTTP"), Simple Mail Transfer Protocol ("SMTP"), Simple Object Access Protocol ("SOAP"), etc.) over the network. The network may be public, private, or a combination thereof and my implement any level of network security measures known in the art.

Computer systems and electronic devices (e.g., sensors or other data gathering devices) may be configured to utilize protocols that are appropriate based on corresponding computer system and electronic device on functionality. Components within the architecture can be configured to convert between various protocols to facilitate compatible communication. Computer systems and electronic devices may be configured with multiple protocols and use different protocols to implement different functionality. For example, a sensor 204 at a reservoir production unit might transmit data via wire connection, infrared, or other wireless protocol to a receiver (not shown) interfaced with a computer, which can then forward the data via fast Ethernet to main computer system 202 for processing. Similarly, the reservoir production units 214 can be connected to main computer system 202 and/or remote computers 220 by wire connection or wireless protocols as known in the art.

Performing a Petroleum Recovery Assessment for a Petroleum Reservoir

FIGS. 1 and 2 and the corresponding text illustrate or otherwise describe one or more systems, components, modules, and/or graphical user interfaces related to receiving, analyzing, and/or displaying data and, in some embodiments, performing a petroleum recovery assessment and/or implementing one or more adjustments to the production of reservoir production units. One will appreciate that embodiments of the present invention can also be described in terms of methods comprising one or more acts for accomplishing a particular result. In some embodiments, the methods are implemented by a computer system including one or more processors executing computer-executable instructions stored on computer-readable media such as computer memory. In particular, the computer memory can store computer-executable instructions that when executed by one or more processors cause various functions to be performed, such as the acts recited in the embodiments. For example, FIGS. 3 and 4, with the corresponding text, illustrate or otherwise describe a sequence of acts in methods for performing a petroleum recovery assessment. As the acts of FIGS. 3 and 4 can be performed on a computing system in some embodiments, they are described below with reference to the components and modules illustrated in FIGS. 1 and 2, where appropriate. Although the method acts may be discussed in a certain order or illustrated in a flowchart as occurring in a particular order, no particular ordering is required unless specifically stated, or required because an act is dependent on another act being completed prior to the act being performed.

Figure 3:
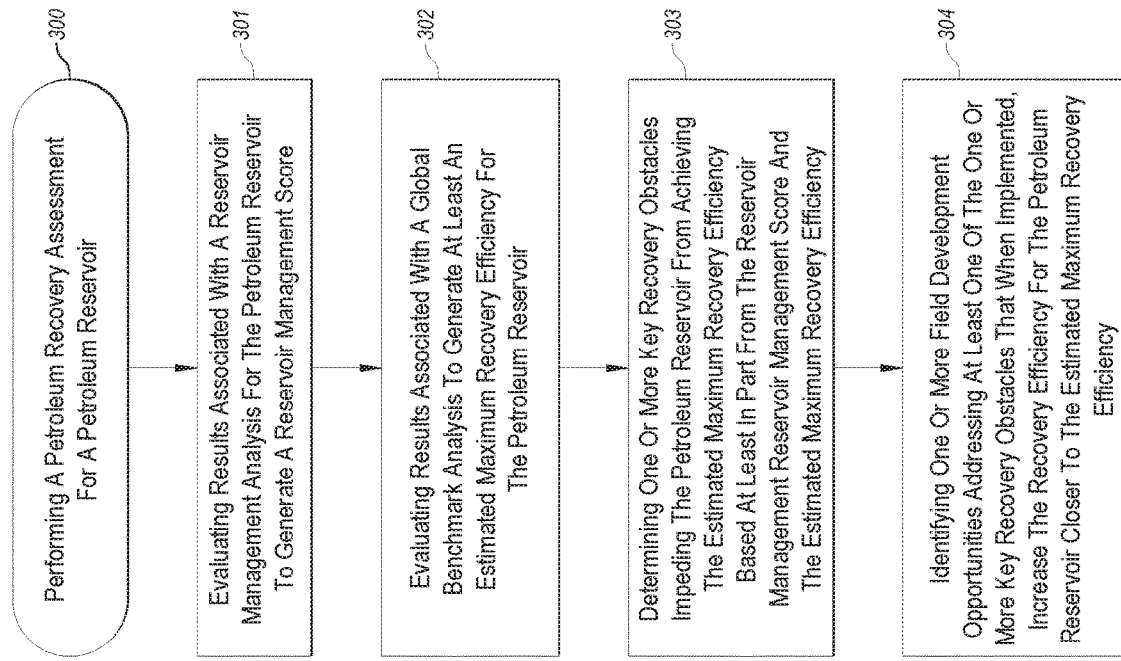
FIG. 3 is a flow diagram illustrating exemplary acts for performing a petroleum recovery assessment for a petroleum reservoir.

FIG. 3 illustrates a flow chart of an example method 300 for performing a petroleum recovery assessment for a petroleum reservoir. In some embodiments, method 300 is implemented on a computing system, such as the computer systems 202, 220 of FIG. 2 and, more generally, embodiments of the computing system 100 of FIG. 1. The computer system 202, 220 and the computing system 100 include at least one hardware processor 102 configured to execute computer-executable instructions and computer-readable storage media for storing computer-executable instructions and/or data structures (e.g., memory 104 of computing system 100).

The method 300 includes evaluating results associated with a reservoir management analysis (e.g., RMR™) for the petroleum reservoir (step 301). In some embodiments, step 301 may include determining or receiving data relating to a reservoir management analysis. Additionally, or alternatively, a reservoir management score can be generated from the evaluated results associated with the reservoir management analysis. Generally, data relating to a reservoir management analysis can include data used to assess one or more categories of reservoir management effectiveness, such as, for example, reservoir management design, reserves appreciation, development and operation plan, reservoir surveillance and monitoring, technology application, and knowledge management. In some embodiments, the results of the reservoir management analysis are used to generate a reservoir management score.

In an embodiment, a computer-executable component 106 of computing system 100 comprises computer-executable instructions that when executed by processor 102 determine results relating to a reservoir management analysis. As an additional example, computer system 202 can comprise computer-executable instructions that when executed by data analysis module 206, which may include or be implemented at a hardware or software processor, determine results relating to a reservoir management analysis. Additionally, or alternatively, computing system 100 or computer system 202 can receive data relating to a reservoir management analysis over a network 110, 230. The data may also be received by computer system 202 from one or more remote computer systems 220 or sensors 204 over network 230. The results may, for example, be stored in memory 104 or data storage 210. The computer-executable instructions for determining results or receiving data relating to a reservoir management analysis may, in some implementations, be configured to do so periodically according to a predefined schedule, or may, in some implementations, be dynamically determined/received in response to a user input received at user interface 208, 224.

In some embodiments, the data that are received by computing systems in step 301 (and other method steps disclosed herein that involve data gathering) result from physical processes. For example, physical processes for data gathering can utilize machinery, such as 1) coring to obtain down-hole rock samples (both conventional and special coring), 2) taking down-hole fluid samples of oil, water and gas, 3) measuring initial pressures from radio frequency telemetry or like devices, and 4) determining fluid saturations from well logs (both cased hole and open hole) each utilize a form of physical machinery to gather data.

Method 300 includes an act or step 302 of evaluating results associated with a global benchmark analysis. In some embodiments, the evaluated results associated with a global benchmark analysis form the basis for generating an estimated maximum recovery efficiency for the petroleum reservoir. Data related to a petroleum reservoir's estimated maximum recovery efficiency can include a recovery potential indicator (e.g., GTI™) and an EURF. As stated above, a GTI™ is, generally, a metric that captures geologic complexities that drive recovery efficiency, and an EURF generally indicates efficiency trends for a specified GTI for other fields that used reservoir best practices and technology. A current recovery efficiency for a field and/or reservoir can be compared to an EURF for the reservoir's GTI to indicate an amount of increased recovery efficiency possible for the reservoir. When implemented at a computing system, step 302 can be performed using the same components describe above with reference to step 301.

Method 300 includes an act or step 303 of determining one or more key recovery obstacles impeding the petroleum reservoir from achieving the estimated maximum recovery efficiency based at least in part from the reservoir management recovery score and the estimated maximum recovery efficiency. In some embodiments, KROs are categorized as recovery process or infrastructure KROs. KRO analysis can also distinguish between primary obstacles, which can require more significant alterations to the recovery design or development plan to overcome, and secondary obstacles, which can be addressed through reservoir management optimizations. In some embodiments, KROs are condensed from the results of the reservoir management analysis. When implemented at a computing system, step 303 can be performed using the same components describe above with reference to step 301.

The method 300 includes an act or step 304 of identifying one or more FDOs addressing the one or more KROs that when implemented increase the recovery efficiency for the petroleum reservoir closer to the estimated maximum recovery efficiency. In some embodiments, identifying one or more FDOs includes identifying significant alterations to a reservoir's/field's recovery design, along with accompanying facility upgrades, and/or along with reservoir management enhancements or increased drilling, which when implemented address a KRO. It should be appreciated that there may be one or more FDOs that can address a given KRO. At the same time, there may be differential costs associated with the one or more FDOs. In at least one implementation of step 304 (and similar steps of identifying an FDO), an FDO is identified that both addresses one or more KROs and is also the most efficient of the identified FDOs. An efficient FDO may be the least costly to implement or may additionally, or alternatively, address two or more KROs, whereas a different FDO addresses less KROs and/or is more costly to implement. In some embodiments, the FDO may be identified that can be automatically implemented by computer system 202. For example, an FDO directed to reservoir management optimizations (e.g., directed to a secondary obstacle) may be chosen if, for example, it can be implemented without manual interjection by an operator and yield an increase in recovery efficiency. Such an FDO may include, for example injecting more/less water, gas, other fluids/gases, or combinations thereof at the same or at a different rate at one or more reservoir production units.

Figure 4:
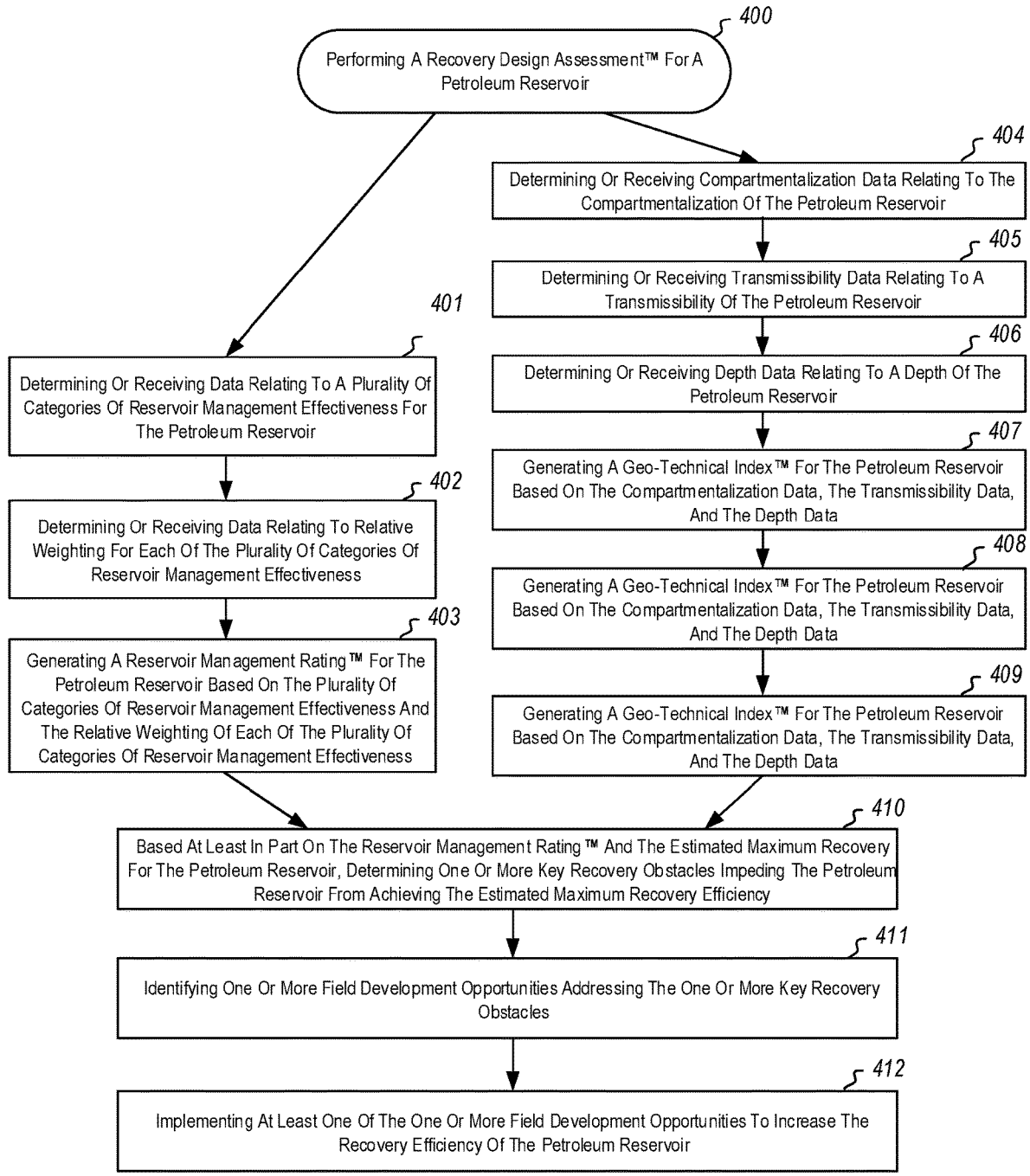
FIG. 4 is a flow diagram illustrating exemplary acts for performing a Recovery Design Assessment™ for a petroleum reservoir.

FIG. 4 illustrates a flow diagram of an example method 400 for performing a Recovery Design Assessment™ (RDA™) for a petroleum reservoir. Broadly, method 400 involves steps for determining an RMR™ (steps 401-403) and for determining an EURF and GTI™ to generate/determine an estimated maximum recovery for the petroleum reservoir based at least in part on the GTI™ and the EURF (steps 404-409). One or more KROs are determined based at least in part on the estimated maximum recovery and RMR™ (step 410) from which one or more FDOs can be identified (step 411) and, in some embodiments, implemented to increase the recovery efficiency of the petroleum reservoir (step 412).

An RMR™ is determined by steps 401-403 of method 400. For example, the method 400 includes determining or receiving data relating to a plurality of categories of reservoir management effectiveness for the petroleum reservoir (step 401), determining or receiving data relating to relative weighting for each of the plurality of categories of reservoir management effectiveness (step 402), and generating a Reservoir Management Rating™ for the petroleum reservoir based on the plurality of categories of reservoir management effectiveness and the relative weighting of each of the plurality of categories of reservoir management effectiveness (step 403).

In some embodiments, RMR™ provides a numerical assessment of relevant performance parameters using closed-form equations, probe questions, and risk factors. Additionally, or alternatively, RMR™ can quantify the efficacy of a complex process as well as the quality of alternative solutions in a standardized and internally consistent manner. RMR™ metrics consider relevant areas of reservoir performance while filtering out non-critical data that might add noise to the evaluation process. In some embodiments, an RMR™ score can be used to benchmark both field development designs and working operations, ensuring that both short-term and long-term views are consistently maintained. By spanning both design and operating phases RMR™ ensures that value is continually planned for and advanced.

In some embodiments, data relating to an RMR™ is used to assess one or more categories of reservoir management effectiveness, such as, for example, reservoir management design, reserves appreciation, development and operation plan, reservoir surveillance and monitoring, technology application, and knowledge management. When assessing one or more categories of reservoir management effectiveness, the resulting rating may be referred to as a cumulative rating.

Assessing reserve management design can include an assessment of the effectiveness of depletion planning and recovery design. Assessing reserves appreciation can include an assessment of the accuracy of reserves estimation and effectiveness at achieving optimal (e.g., maximum) recovery. Assessing development and operating plan can include an assessment of current reservoir performance relative to recovery design and depletion planning. Assessing reservoir surveillance and monitoring can include an assessment of the planning and implementation of a master surveillance plan and the effectiveness of the plan at measuring reservoir performance indicators. Assessing technology application can include an assessment of an asset management team's receptiveness to new technology. Assessing knowledge management can include an assessment of the asset management team's effectiveness at leveraging corporate intellect.

RMR™ categories can be weighted relative to one another for use in generation of an RMR™ score. For example, reservoir management design can be weighted 25%, reserves appreciation can be weighted 25%, development and operation plan can be weighted 20%, reservoir surveillance and monitoring can be weighted 10%, technology application can be weighted 15%, and knowledge management can be weighted 5%. RMR™ categories can also be subdivided into more specific subcategories providing a more detailed formulation of reservoir management effectiveness. Table 1 depicts an example of categories and corresponding sub-categories related to RMR™.

TABLE 1

| | Knowledge Management | | | | |
|---|---|---|---|---|---|
| Category | Reservoir Management Design | Reserves Appreciation | Development & Operating Plan | Reservoir Surveillance | Technology Application |
| Subcategories | Recovery Design | OIIP Verification | Production Plan Achievement | Master Plan Design | Drilling Technology |
| | Field Depletion Rate Well Rate/ Drawdown Displacement Process Risk | Sweep Efficiency Displacement Efficiency Reserves Verification | Pressure Management Field Productivity Gas Management | Master Plan Implementation | Completion Technology Stimulation Technology Reservoir Dynamics Technology |
| | Plateau Sustainability | Risk Mitigation | Water Management Drawdown Management | | |

The categories and subcategories in Table 1 can be used to determine whether an effective reservoir management design is in place and whether it is based on reservoir management best practices. The categories and subcategories can also be used to identify reservoir management deficiencies, which, if remedied, represent opportunities to improve field and/or reservoir performance.

Within the reservoir management design category, each subcategory is defined, along with how to maximize the subcategory, as follows:

Recovery Deficiency Indicator™ (RDI™)—measures estimated ultimate recovery efficiency relative to an ideal, or maximum achievable, recovery efficiency. The maximum achievable recovery efficiency is defined by the total amount of moveable oil—or, if adequate data is unavailable, the maximum recovery efficiency achieved by the trend of global benchmark fields as calculated using the Geo-Technical Index (GTI™). RDI can be maximized by a depletion plan targeting recovery of 100% of moveable oil.

Field Depletion Index (FDI)—measures the rate of reserves depletion relative to an optimal reserves life window. By accounting for geologic complexity and reserves risk, the optimal reserves life window is unique for each field. Field production outside this window—above or below—results in a lower score. FDI can be maximized by maintaining field production within the optimal reserves life window.

Well Rate/Drawdown Index (WRDI)—measures the quality of drawdown guidelines applied to constrain well rates. WRDI can be maximized by constraining drawdown based on analog studies, empirical correlations, and reservoir simulation.

Displacement Process Risk Index (DPRI)—measures the downside risk in recovering 2P reserves, and the quality of downside risk analysis. DPRI can be maximized by performance of high quality risk analysis, and by a development plan that minimizes downside risk.

Plateau Sustainability Index (PSI)—measures the amount of EUR recovered while field production is at plateau. PSI can be maximized by a depletion plan which allows for >50% of EUR to be recovered while field production is at plateau.

Within the reserves appreciation category, each subcategory is defined, along with how to maximize the subcategory, as follows:

OIIP Verification Index (OVI)—measures the quality of studies by which OIIP is estimated. Inputs include qualitative assessments of geologic/petrophysical modeling, studies validating critical log parameters, studies verifying net-pay cutoffs and field limits, and comprehensive OIIP studies which incorporate all available data. OVI can be maximized by robust studies in each of these areas.

Sweep Efficiency Index (SEI)—measures total sweep efficiency, areal and vertical, in swept areas (not applicable for reservoirs under depletion drive). SEI can be maximized by a depletion plan which maximizes total sweep efficiency.

Displacement Efficiency Index (DEI)—measures the quality of lab data, field trials, and analyses by which displacement efficiency is estimated (not applicable for reservoirs under depletion drive). DEI can be maximized by a high quality estimate of displacement efficiency through both collection of lab data and performance of field trials.

Reserves Verification Index (RVI)—measures the quality of lab data, field performance data, and analysis by which 2P reserves are estimated. Also accounts for the quality of analysis by which upside and downside reserves are estimated. RVI can be maximized by high quality estimates of 2P reserves, and high quality estimates of upside and downside reserves.

Risk Mitigation Index (RMI)—measures the extent to which 1) key reservoir uncertainties have been identified and ranked, 2) leading indicators for highside and lowside outcomes have been developed, 3) contingency plans for highside and lowside outcomes have been prepared, and 4) lessons learned and best practices have been incorporated into uncertainty analysis. RMI can be maximized by preparation of a high quality uncertainty assessment that incorporates the four factors listed above.

Within the development and operation plan category, each subcategory is defined, along with how to maximize the subcategory, as follows:

Production Plan Achievement Index (PPAI)—measures the variance of actual production relative to 1-year and 5-year forecasts. PPAI can be maximized by actual production data that closely matches the 1-year and 5-year forecasts.

Field Productivity Deficiency Index (FPDI)—measures the decline in average well productivity index (e.g., production divided by drawdown) relative to a target productivity index (such as average productivity index at initial production). FPDI can be maximized by maintaining well productivity indices at their target (or initial) values.

Pressure Management Index (PMI)—measures reservoir pressure relative to a target value, such as bubble point pressure (Pb) or initial pressure (Pi). PMI can be maximized by maintaining reservoir pressure above a target level (such as Pb or Pi).

Gas Management Index (GMI)—measures the impact of gas breakthrough on field performance by calculating 1) the rate of change of producing GOR, 2) the fraction of wells producing above solution GOR, and 3) the fraction of wells shut-in due to high GOR. GMI can be maximized by preventing gas breakthrough.

Water Management Index (WMI)—measures the impact of water breakthrough on field performance by calculating the rate of change of measured water cut. WMI can be maximized by preventing water breakthrough.

Drawdown Management Index (DMI)—measures the effectiveness of drawdown guidelines by calculating the portion of wells producing within their 10% of their design limit. DMI can be maximized by enforcing strict drawdown constraints on all wells.

The reservoir surveillance category accounts for the efficacy of the design and implementation of a Master Surveillance Plan. The objectives of a well-designed plan include: (a) integration of reservoir surveillance activities into recovery design and development plan, (b) integration of reservoir surveillance activities into other best practices of reservoir management, (c) customized reservoir surveillance activities tailored to reservoir characteristics and recovery processes, (d) reducing uncertainty in development plan, and planning for early identification of downside leading indicators, (e) field-wide fluid contact monitoring, and (f) allowing for proactive, rather than reactive, reservoir management. Some characteristics of a well-designed plan include: (1) permanent down-hole monitoring, (2) real-time data acquisition, (3) good areal and vertical coverage throughout reservoir, (4) dedicated observation wells, (5) drilling of wells in areas of tight spacing to assess sweep, (6) periodic acquisition of core, log, and PVT data, (7) specific definition of methods and frequency of production and injection rates, (8) frequent testing and application of new surveillance technologies, and (9) annual review and updating. The Reservoir Surveillance Index (RSI) can be maximized by designing and implementing a Master Surveillance Plan that meets the objectives and exhibits the characteristics outlined above.

The technology application category reflects the receptiveness of the asset management team to new technology. New technologies are defined as those technologies not previously evaluated or deployed in the reservoir to which RMR™ is being applied. Scores are determined by assessing whether new technologies are being deployed, field tested, or evaluated in the four sub-categories given below:

Drilling Technology Index (DTI)—accounts for the implementation of new or alternate drilling technologies.

Completion Technology Index (CTI)—accounts for the implementation of new or alternate completion and production technologies.

Stimulation Technology Index (STI)—accounts for the implementation of new or alternate stimulation and enhanced oil recovery (EOR) technologies.

Reservoir Dynamics Technology Index (RDTI)—accounts for the implementation of new or alternate reservoir characterization technologies.

Technology application sub-categories can be maximized by frequent evaluation, field-testing, and deployment of new or alternate technologies in each category.

The knowledge management (KM) category reflects the ability of the asset management team to leverage corporate intellect and capture, correlate, and share mission critical information. Some characteristics of effective Knowledge Management include: (a) validation of data for veracity and accuracy, (b) accessibility of needed project data, (c) real-time data acquisition, (d) collaborative workflow which are multi-disciplinary and data-driven, (e) integration of disparate data sources in meaningful ways, (f) identification and alerting to abnormal trends, and (g) captured organizational memory through best-practice libraries and directories of subject matter experts. The knowledge management category is maximized through data systems which exhibit the above characteristics.

In some embodiments, the RMR™ includes a plurality of thresholds such that when the weighted (or unweighted) set of categories used to determine the score are selectively or collectively compiled, the resulting quantitative RMR™ score falls above and/or below one or more thresholds. An RMR™ score may be plotted on a scale from 0-1, 1-10, a scale derived from a scalar multiple of one or both upper and lower thresholds illustrated by the foregoing, or it may be plotted on an unbounded scale. For example, an RMR™ score may be plotted on a scale from 1-100 with, for example, three thresholds. A first threshold at 30, a second threshold at 50, and a third threshold at 70. If an RMR™ score falls below the first threshold, the reservoir/field requires significant overhauls of processes and infrastructure in one or more categories of reservoir management effectiveness (e.g., reservoir management design, reserves appreciation, development and operation plan, reservoir surveillance and monitoring, technology application, and knowledge management). If an RMR™ score falls between 30 and 50, there are major FDOs (e.g., FDOs addressing primary KROs) to be implemented to one—or likely both—of infrastructure and processes found in the aforementioned categories of reservoir management effectiveness. If, the RMR™ score falls between the second and third threshold (e.g., between 50 and 70), there are likely few FDOs directed towards addressing primary KROs but there may be at least some FDOs directed towards addressing secondary KROs. If the RMR™ score falls above the third threshold (e.g., above 70), the FDOs identified are likely directed to one or more secondary KROs, or there may be a single FDO directed to one primary KRO. In essence, an RMR™ score exceeding the highest threshold is likely operating close to—and in some cases may even be exceeding—the estimated maximum recovery for the reservoir.

Referring back to FIG. 4, method 400 includes determining or receiving compartmentalization data relating to the compartmentalization of the petroleum reservoir (step 404), determining or receiving transmissibility data relating to a transmissibility of the petroleum reservoir (step 405), determining or receiving depth data relating to a depth of the petroleum reservoir (step 406). When implemented on a computing system, as shown, for example in FIG. 2, the foregoing steps (e.g., steps 404-406) may be implemented on computer system 202 or a plurality of computer systems 202 having similar functionality but wherein one or more of the aforementioned steps are implemented on different computer systems 202. Additionally, or alternatively, any of compartmentalization of the petroleum reservoir, transmissibility of the petroleum reservoir, and/or the depth of the petroleum reservoir can be received by computer system 202 from sensors 204 or determined by computer system 202 after accessing historical data stored in database server 210.

Method 400 additionally includes generating a GTI™ for the petroleum reservoir based on the compartmentalization data, the transmissibility data, and the depth data (step 407). As defined herein, a GTI™ is a metric that captures geologic complexities that drive recovery efficiency. The GTI™ has a demonstrated ability to capture recovery drivers for reservoirs of various rock types, including clastic and carbonate rock types. Step 407 can be implemented, for example, according to the following equation:

$$GTI^{TM} = (n_A)A + (n_B)B + (n_C)C, \text{ where:}$$

A=Compartmentalization Factor. The Compartmentalization Factor accounts for compartmentalization and/or discontinuities (vertically and/or horizontally) within a reservoir. Highly compartmentalized or discontinuous reservoirs exhibit lower recovery efficiency;

B=Transmissibility Index. The Transmissibility Index accounts for reservoir thickness, net-to-gross, permeability, and fluid viscosity. Higher transmissibility correlates with higher recovery efficiency;

C=Depth Factor. The Depth Factor accounts for the depth of the reservoir. Shallow reservoirs can exhibit higher recovery efficiency than deeper reservoirs, due to increased time and cost required to drill (hence the ultimate spacing that can be attained), and the time and cost required to monitor and intervene in the reservoir; and $n_X$=weight coefficients, where X={A, B, C}.

Method 400 additionally includes determining an EURF based at least in part on a plurality of reservoirs making use of reservoir management best practices and increased technology (step 408). An EURF represents a global benchmark of fields having similar geologic complexity that are making use of reservoir management best practices and increased technology. Comparing a Geo-Technical Index™ (GTI™) to an EURF (a global benchmark trend) provides an appropriate estimate of potential recovery efficiency gains that can be realized from improving reservoir management. Accordingly, method 400 includes determining an estimated maximum recovery for the petroleum reservoir based at least in part on the GTI™ and the EURF (step 409). Based at least in part on the RMR™ (determined in step 403) and the estimated maximum recovery for the petroleum reservoir (determined in step 409), method 400 additionally includes determining one or more KROs impeding the petroleum reservoir from achieving the estimated maximum recovery efficiency (step 410). Additionally, method 400 includes identifying one or more FDOs addressing the one or more KROs (step 411), and implementing at least one of the one or more FDOs to increase the recovery efficiency of the petroleum reservoir (step 412).

As discussed above with respect to FIG. 2, in some embodiments, monitoring and analysis system 200 can implement FDOs automatically or provide a notification to a user/operator through user interface 208, 224, and/or dashboard display module. If implemented automatically, periodically, or in response to a user authorization, computer system 202 can adjust production of one or more reservoir production units 214, as previously discussed.

Figure 5:
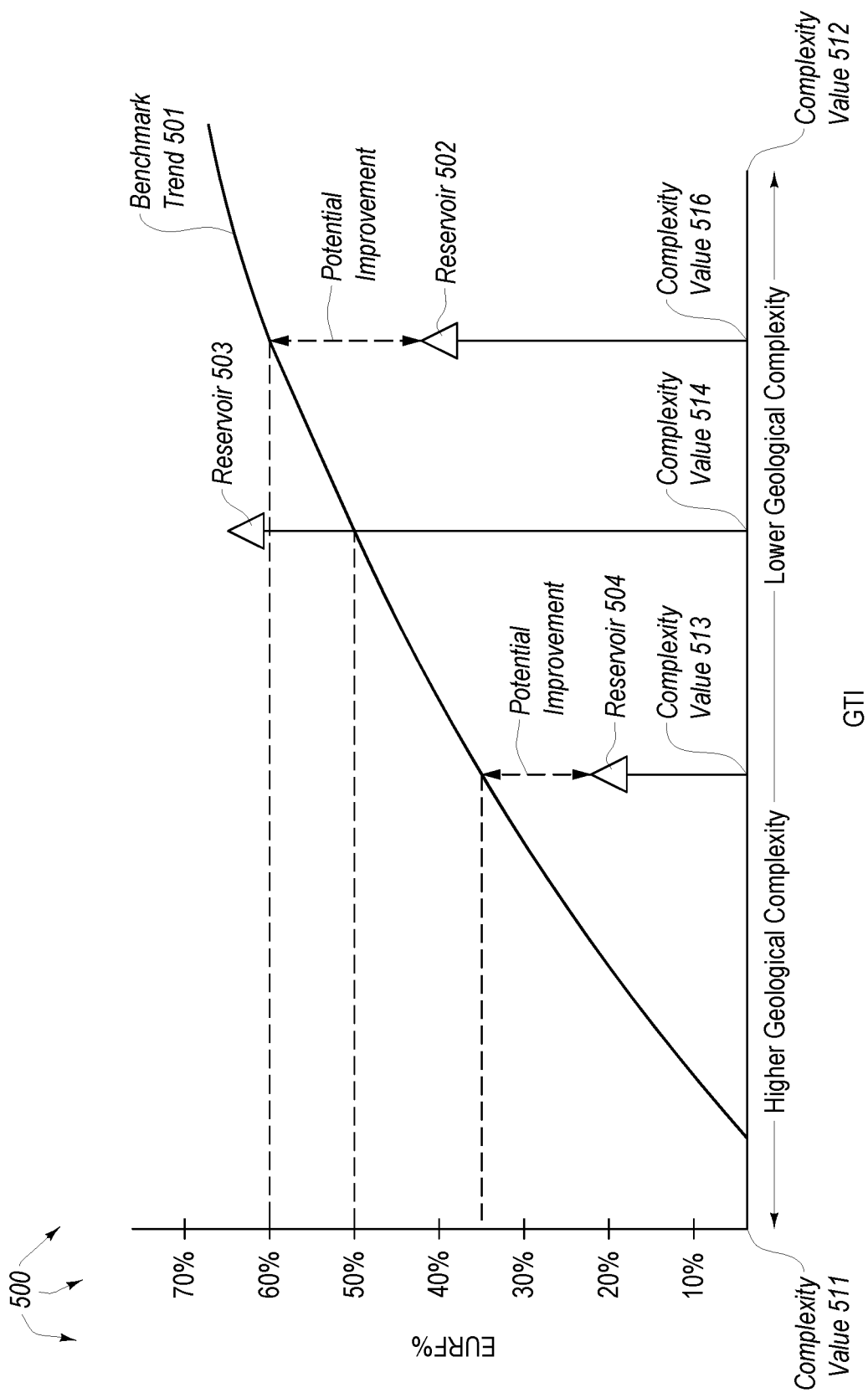
FIG. 5 is a graph illustrating an Estimated Ultimate Recovery Factor (EURF) versus an exemplary recovery potential indicator, the Geo-Technical Index™.

Referring now to FIG. 5, illustrated is a graph 500 of Estimated Ultimate Recovery Factor (EURF) versus Geo-Technical Index™ (GTI™). Depicted in graph 500 is benchmark trend 501. Benchmark trend 501 represents an EURF (as a percentage) for reservoirs using best practices and technology. GTI™ represents the geological complexity of a petroleum reservoir from higher complexity at complexity value 511 on the left to lower complexity at complexity value 512 on the right. In some embodiments, benchmark trend 501 represents the estimated maximum recovery for a given reservoir/field.

As graph 500 depicts, petroleum reservoirs of higher geological complexity tend to have a lower EURF. On the other hand, petroleum reservoirs of lower geological complexity tend to have a higher EURF. Reservoirs having an EURF below benchmark trend 501 are operating less efficiently than other reservoirs of comparable GTI™ used to compute benchmark trend 501.

For example, benchmark trend 501 indicates that reservoirs having a GTI similar to complexity value 513 are to have an EURF of around 35%. However, reservoir 504 has an EURF of around 20%. Thus, implementing FDOs to address KROs for reservoir 503 could result in a potential improvement in EURF of around 15%. Similarly, benchmark trend 501 indicates that reservoirs having a GTI™ similar to complexity value 516 are estimated to have an EURF of around 60%. However, reservoir 502 has an EURF of around 40%. Thus, implementing FDOs to address KROs for reservoir 502 could result in a potential improvement in EURF of around 20%.

On the other hand, benchmark trend 501 indicates that reservoirs having a GTI similar to complexity value 514 are estimated to have an EURF of around 50%. However, the EURF of reservoir 503 exceeds 50%. Accordingly, resources may be better allocated to address KROs for other reservoirs, as reservoir 503 is exceeding expected/estimated maximum recovery.

Figure 6A:
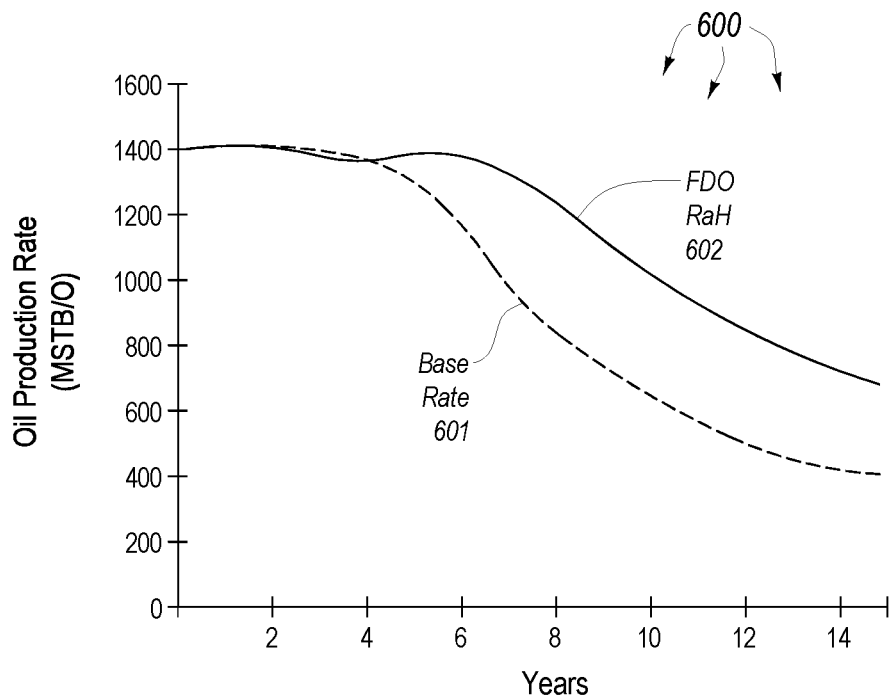
FIG. 6A illustrates a chart depicting estimated oil production rates for a petroleum producing field over time with and without an implementing one or more Field Development Opportunities (FDOs)
Figure 6B:
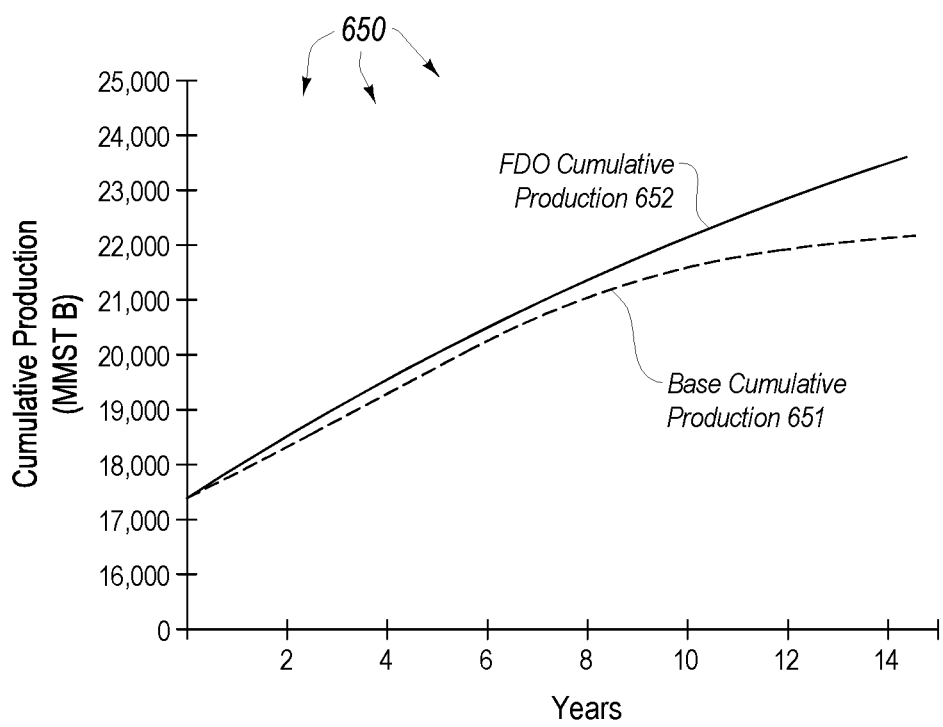
FIG. 6B is a chart illustrating estimated cumulative production for a petroleum producing field over a period of time with and without the implementation of Field Development Opportunities (FDOs)

FIG. 6A is a chart 600 illustrating estimated oil production rates for an example petroleum producer over a period of time with and without the implementation of FDOs. As depicted, between around year 4 to year 14 of production, FDO rate 602 is higher than the base rate 601 (by around 200 MSTB/d). FIG. 6B is a chart 650 illustrating estimated cumulative production for an example petroleum producer over a period of time with and without the implementation of FDOs. As depicted, after 14 years, FDO cumulative production 652 is higher than base cumulative production 651 (by around 1,000 MMSTB).

Figure 7:
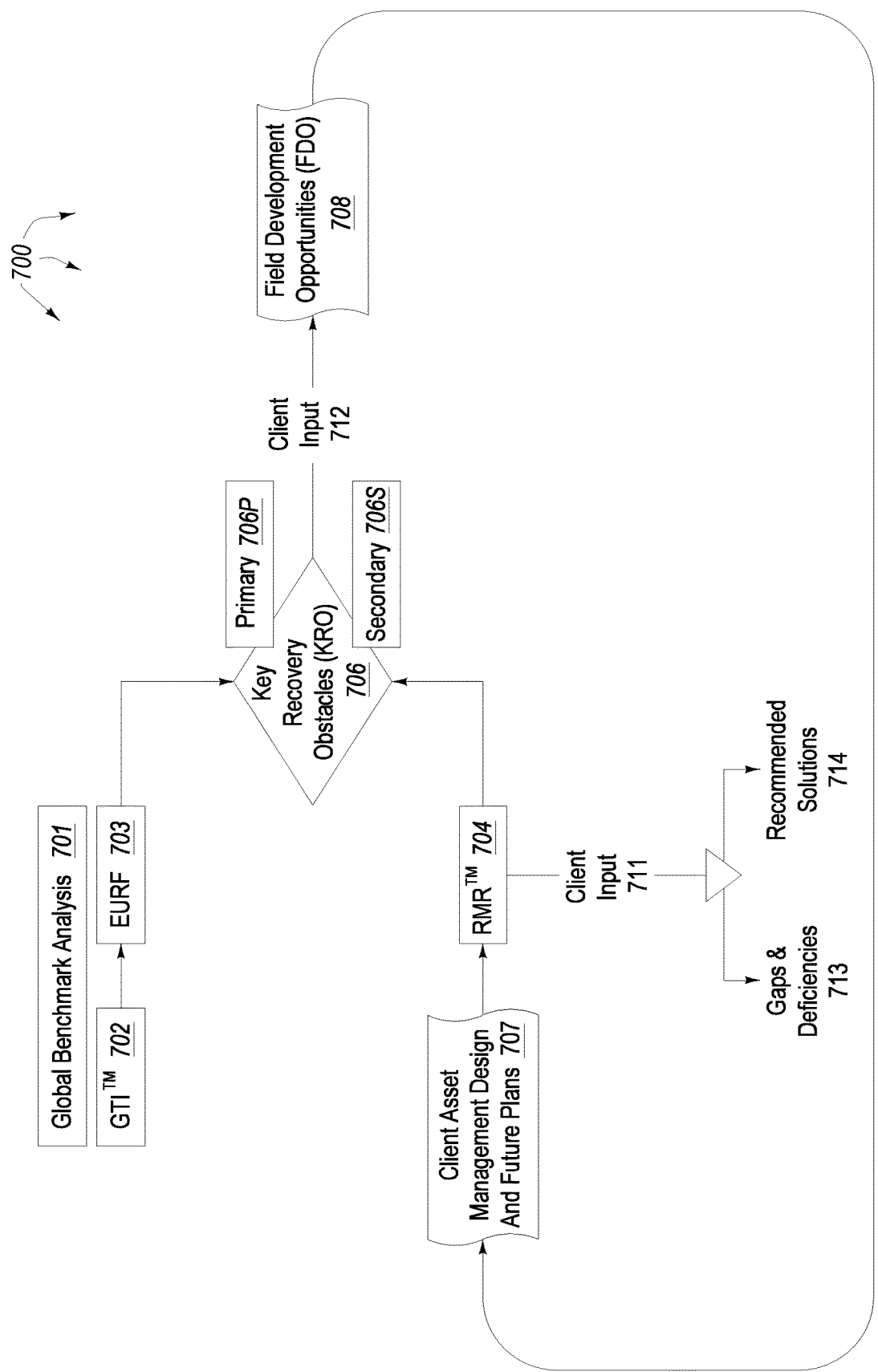
FIG. 7 is a flow diagram that illustrates other exemplary acts for performing a Recovery Design Assessment™ for a reservoir.
Figure 4:
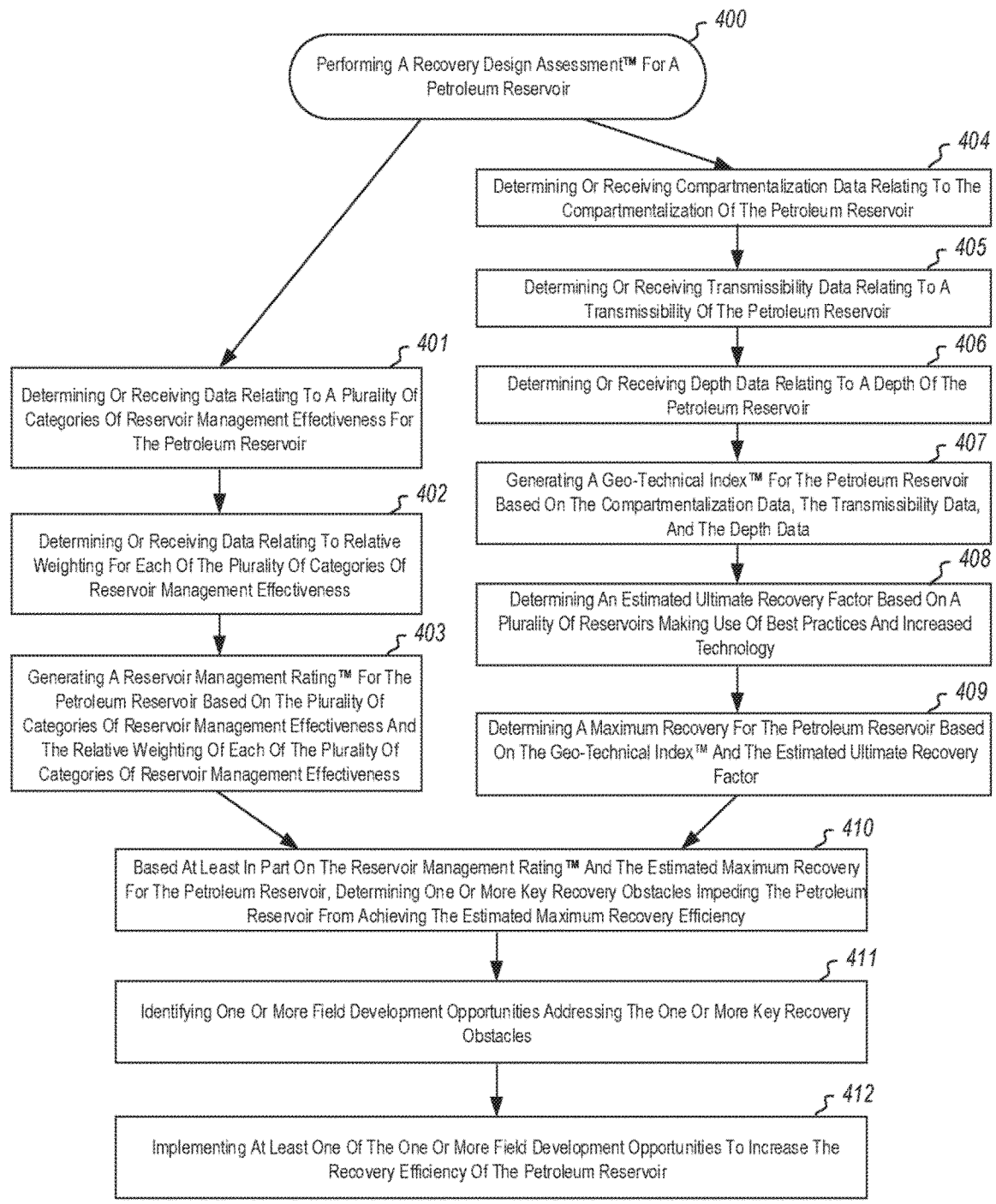

FIG. 7 is a flow diagram 700 that illustrates other exemplary acts for performing an RDA™ for a petroleum reservoir. As depicted, global benchmark analysis 701 includes comparing GTI™ 702 to EURF 703 to determine if the recovery efficiency for the petroleum reservoir is in accordance with global trends. RMR™ 704 is performed on client asset management design and future plans 707. In combination with user input 711, gaps and deficiencies 713, and recommended solutions 714 are identified. Key recovery obstacles 706, including primary obstacles 706P and secondary obstacles 706S, are identified from the output of global benchmark analysis 701 and RMR™ 704. Client input 712 is used to formulate FDOs 708 that address KROs 706. Field development opportunities 708 can be used to adjust client asset management design and future plans 707, which results in increased recovery efficiency at the reservoir.

In short, the present invention provides a simple, yet powerful, diagnostic tool, RDA™, that can be used to accurately determine how to improve recovery efficiency at a petroleum reservoir. A combination of global benchmark analysis and reservoir management assessment is utilized to identify areas of reservoir management that can be improved to increase recovery efficiency. One part of the inventiveness of the disclosed methods lies in their simplicity and ease of implementation. Although sophisticated managers and operators of petroleum reservoirs have been assessing capital projects for decades, and there has existed a long-felt need for finding improved and more streamlined methods for assessing opportunities for technically and economically increasing petroleum production, those of skill in the art have overlooked and failed to appreciate the powerful diagnostic power and quick implementation of the methods disclosed herein, which satisfy a long-felt need known in the art but heretofore unsatisfied. Moreover, the accuracy by which one may quickly determine how to increase recover efficiency for a petroleum reservoir is, compared to conventional practices, unpredictable and an unexpected result.

Abbreviated List of Defined Terms

To assist in understanding the scope and content of the foregoing written description and appended claims, a select few terms are defined directly below. Unless defined otherwise, all technical and scientific terms used herein have the same meaning as commonly understood by one of ordinary skill in the art to which the present disclosure pertains.

An Estimated Ultimate Recovery Factor (EURF) represents a global benchmark trend for fields having similar geologic complexity and which are making use of reservoir management best practices and updated technology. Comparing a recovery potential indicator (such as GTI™) to an EURF provides an estimate of potential gains from improving reservoir management. In some embodiments, the foregoing estimate of potential gains is derived from an estimated maximum recovery resulting from a relation of the recovery potential indicator and the EURF.

The term "field development opportunity" or "FDO" as used herein includes a step, series of steps or action(s) that is designed to address one or more key recovery obstacle(s)—as that term is defined herein—to, for example, sustain production plateaus, mitigate field decline rates, and/or improve long term recovery efficiency. As an FDO is designed to address one or more key recovery obstacle(s), it should be understood that an FDO at least maintains the recovery efficiency of the affected reservoir, and in some instances increases the recovery efficiency. Accordingly, as used herein, an FDO may additionally include a production forecast that illustrates the likely production response after implementation of the FDO. The production forecast may be a short-term forecast (e.g., measured in hours, days, weeks, months, or even a few years) or a long-term forecast (e.g., a forecasting illustrating production for a plurality of years to come).

As exemplary non-limiting examples, an FDO can include drilling new well(s) in existing petroleum reservoir(s)/production field(s), adjusting the amount and/or rate of material injected into an existing well (e.g., injecting more/less water, gas, other fluids/gases, or combinations thereof at the same or at a different rate), implementing peripheral water flooding, re-activating an existing well, implementing a well cycling program, improving reservoir surveillance, improving drawdown constraints, improving infill drilling, using sand control screens, or similar. Additionally, or alternatively, an FDO can address significant alterations to a petroleum reservoir's recovery design along with accompanying facility upgrades and/or reservoir management enhancements.

As used herein, a "recovery potential indicator" describes any objective measure of the geologic complexities driving the recovery efficiency of a reservoir. An exemplary recovery potential indicator includes the Geo-Technical Index™ (GTI™). In some embodiments, a GTI™ is calculated from a number of factors that capture recovery drivers within a reservoir. In general, the dimensionless GTI™ can be defined by the following equation:

$$GTI™ = (n_A)A + (n_B)B + (n_C)C, \text{ where:}$$

A=Compartmentalization Factor. The Compartmentalization Factor accounts for compartmentalization and/or discontinuities (vertically and/or horizontally) within a reservoir. Highly compartmentalized or discontinuous reservoirs exhibit lower recovery efficiency;

B=Transmissibility Index. The Transmissibility Index accounts for reservoir thickness, net-to-gross, permeability, and fluid viscosity. Higher transmissibility correlates with higher recovery efficiency;

C=Depth Factor. The Depth Factor accounts for the depth of the reservoir. Shallow reservoirs can exhibit higher recovery efficiency than deeper reservoirs, due to increased time and cost required to drill (hence the ultimate spacing that can be attained), and the time and cost required to monitor and intervene in the reservoir; and $n_X$=weight coefficients, where X={A, B, C}.

As used herein, the term "key recovery obstacle" or "KRO" includes aspects or characteristics of an petroleum producing field that impede the field from achieving maximum recovery efficiency from any of one or more petroleum reservoirs. In some instances, a KRO is based on a trend(s) of global benchmarks. A KRO can be associated with an aspect of the infrastructure of a petroleum producing field/reservoir or with a petroleum recovery process implemented at a given reservoir/reservoir production unit. Additionally, the analysis deriving KROs can distinguish between primary obstacles, which typically require more significant alterations to the recovery process and/or the infrastructure to be overcome, and secondary obstacles, which can be addressed through reservoir management optimizations. Exemplary KROs include a decline of reservoir pressure, a reduced sweep efficiency, bypassed petroleum, gas breakthrough, water breakthrough, a high depletion rate, sand problems, etc. In general, recovery efficiency of a reservoir/field can be maximized by eliminating or addressing any KRO.

The term "petroleum producing field," as used herein refers to an area of land that includes petroleum reservoir(s), and when appropriate, additionally refers to the infrastructure and apparatuses associated therewith. For example, a petroleum producing field includes a petroleum reservoir(s) and may additionally include a plurality of oil wells associated with the petroleum reservoir(s) and any equipment associated therewith (e.g., pumps, pipelines, drilling rigs, etc.). In some embodiments, this term is used as a reference of scope. That is, the term "petroleum producing field" may reference a large petroleum production area having a plurality of wells and/or reservoirs whereas a "petroleum reservoir," as used herein, is merely a subset of an oil field. In some instances, the term "petroleum producing field" is synonymous with the more colloquial term "oil field."

As used herein, the term "petroleum reservoir" or "reservoir" encompasses a subsurface pool of hydrocarbons contained in porous and/or fractured rock formations. The hydrocarbons include naturally occurring hydrocarbons, such as crude oil and/or natural gas. A "petroleum reservoir" or "reservoir," as used herein, should be understood to include both conventional and unconventional reservoirs as known in the art. Accordingly, these terms are directed at the geological body that comprises the petroleum products to be extracted.

As used herein, the term "reservoir management analysis" refers to a quantification of the effectiveness of reservoir management for a petroleum reservoir based on metrics, indices, and quality measures addressing various elements of reservoir management design. In some instances, a reservoir management analysis can include weighting of one or more metrics, indices, and quality measures when quantifying a reservoir management analysis score. Additionally, a reservoir management analysis can indicate one or more thresholds that indicate a qualitative measure of the effectiveness of the reservoir management systems and processes.

An exemplary reservoir management analysis includes the "Reservoir Management Rating™," or "RMR™." An RMR™ score can be used to benchmark both field development designs and working operations, helping ensure that both short-term and long term-views are consistently maintained. Generally, the Reservoir Management Rating™ (RMR™) is a structured investigative approach that quantifies the efficacy of reservoir management design for a petroleum reservoir. RMR™ can utilize a set of metrics, indices, and quality measures that address the key elements of reservoir management design, value enhancement, and performance monitoring. Using RMR™, reservoir management gaps can be identified and appropriate solutions recommended.

Various aspects of the present disclosure, including devices, systems, and methods may be illustrated with reference to one or more embodiments or implementations, which are exemplary in nature. As used herein, the term "exemplary" means "serving as an example, instance, or illustration," and should not necessarily be construed as preferred or advantageous over other embodiments disclosed herein. In addition, reference to an "implementation" of the present disclosure or invention includes a specific reference to one or more embodiments thereof, and vice versa, and is intended to provide illustrative examples without limiting the scope of the invention, which is indicated by the appended claims rather than by the following description.

The present disclosure may be embodied in other specific forms without departing from its spirit or essential characteristics. The described embodiments are to be considered in all respects only as illustrative and not restrictive. The scope of the invention is, therefore, indicated by the appended claims rather than by the foregoing description. While certain embodiments and details have been included herein and in the attached disclosure for purposes of illustrating embodiments of the present disclosure, it will be apparent to those skilled in the art that various changes in the methods, products, devices, and apparatus disclosed herein may be made without departing from the scope of the disclosure or of the invention, which is defined in the appended claims. All changes which come within the meaning and range of equivalency of the claims are to be embraced within their scope.

What is claimed is:

1. A method for performing a petroleum recovery assessment for a petroleum reservoir, comprising:
    evaluating results associated with a reservoir management effectiveness for the petroleum reservoir;
    wherein the results associated with the reservoir management effectiveness include at least one of reservoir management design, reserves appreciation, development and operation plan, reservoir surveillance and monitoring, technology application, and knowledge management;
    generating a reservoir management rating (RMR) based on the evaluated results associated with the reservoir management effectiveness;
    evaluating results associated with a global benchmark analysis;
    generating an estimated maximum recovery efficiency for the petroleum reservoir based on the evaluated results associated with the global benchmark analysis;
    determining one or more key recovery obstacles impeding the petroleum reservoir from achieving the estimated maximum recovery efficiency based at least in part from the reservoir management rating (RMR) and the estimated maximum recovery efficiency; and
    identifying one or more field development opportunities addressing at least one of the one or more key recovery obstacles that when implemented, increase a recovery efficiency for the petroleum reservoir closer to the estimated maximum recovery efficiency; and
    implementing or assisting in implementing the one or more field development opportunities addressing at least one of the one or more key recovery obstacles, the one or more field development opportunities including manually or automatically adjusting operation of one or more production units selected from producing oil wells, water injection wells, gas injection wells, heat injectors, or sub-components thereof, and wherein adjusting the operation of the one or more production units is selected from change in volume, change in pressure, change in temperature, change in well bore path, drilling one or more new production units, implementing peripheral water flooding, re-activating an existing well, or shutting down one or more existing production units.

2. The method as in claim 1, further comprising using the RMR as a score to benchmark both field development designs and working operations for the petroleum reservoir.

3. The method as in claim 2, wherein the RMR comprises a value on a scale, the scale comprising one or more thresholds.

4. The method as in claim 3, wherein the scale comprises:
    a first threshold; and
    a second threshold having a greater value on the scale than the first threshold,
    wherein the first threshold defines a low RMR region and an upper region, the upper region comprising the second threshold, and the second threshold defines a mid-range RMR region between the first and second thresholds and a high RMR region defined above the second threshold.

5. The method as in claim 4, wherein the determining one or more key recovery obstacles comprises determining one or more primary key recovery obstacles and/or one or more secondary key recovery obstacles, the primary key recovery obstacles being addressable through alterations to recovery design or development plan, and the secondary key recovery obstacles being addressable through reservoir management optimizations.

6. The method as in claim 5, wherein the low RMR region comprises a low RMR associated with a plurality of primary key recovery obstacles, wherein the mid-range RMR region comprises a mid-range RMR associated with one or more primary key recovery obstacles and one or more secondary key recovery obstacles, and wherein the high RMR region comprises a high RMR associated with one or more secondary key recovery obstacles.

7. The method as in claim 1, wherein the RMR comprises a cumulative rating of multiple categories selected from reservoir management design, reserves appreciation, a development and operating plan, reservoir surveillance and monitoring, technology application, and knowledge management.

8. The method as in claim 7, wherein the multiple categories are independently or co-dependently weighted.

9. The method as in claim 1, wherein the global benchmark analysis comprises
    calculating an estimated ultimate recovery factor; and
    calculating a recovery potential indicator.

10. The method as in claim 9, wherein the estimated ultimate recovery factor is a benchmark recovery efficiency for one or more petroleum producing fields that use reservoir management best practices and technology.

11. The method as in claim 9, wherein the recovery potential indicator comprises a geo-technical index, and wherein calculating the geo-technical index comprises summing at least a compartmentalization factor, a transmissibility index, and a depth factor for the petroleum reservoir.

12. The method as in claim 11, wherein the compartmentalization factor, the transmissibility index, and the depth factor are individually associated with a weight coefficient such that the geo-technical index (GTI) is calculated according to Formula 1:

$$GTI = (n_A)A + (n_B)B + (n_C)C, \quad \text{Formula 1:}$$

where A comprises the compartmentalization factor, B comprises the transmissibility index, C comprises the depth factor, and $n_A$, $n_B$, and $n_C$ comprise weight coefficients for the compartmentalization factor, transmissibility index, and depth factor, respectively.

13. The method as in claim 1, wherein the one or more field development opportunities comprise one or more of: drilling one or more new wells at the petroleum reservoir, adjusting an amount and/or rate of a material injected into an existing well, wherein the material comprises one or more of water, gas, or a combination thereof, implementing peripheral water flooding, re-activating an existing well, implementing a well cycling program, improving reservoir surveillance, improving drawdown constraints, improving infill drilling, or using sand control screens.

14. The method as in claim 1, further comprising implementing at least one field development opportunity selected from the one or more field development opportunities to increase the recovery efficiency of the petroleum reservoir.

15. A method of performing a recovery design assessment for a petroleum reservoir, comprising:
measuring, using one or more sensors placed in a petroleum reservoir supplying the petroleum producing field, physical or geological characteristics of the petroleum reservoir directly or indirectly relating to at least some of the reservoir pressure, fluid saturation, well productivity and draw down, fluid profile, oil production, gas production, water production, injection rate, displacement efficiency, sweep efficiency, bypassed petroleum, gas breakthrough, water breakthrough, depletion rate, compartmentalization, vertical and/or horizontal discontinuity, reservoir thickness, reservoir permeability, fluid viscosity, reservoir depth, and sand problems;
analyzing data relating to a plurality of categories of reservoir management effectiveness for the petroleum reservoir;
analyzing data relating to a relative weighting for each of the plurality of categories of reservoir management effectiveness; and
based on the plurality of categories of reservoir management effectiveness and the relative weighting of each of the plurality of categories of reservoir management effectiveness, generating a reservoir management rating (RMR) for the petroleum reservoir;
determining a compartmentalization factor based on compartmentalization data for the petroleum reservoir;
determining a transmissibility index based on transmissibility data for the petroleum reservoir;
determining a depth factor based on depth data for the petroleum reservoir; and
based on the compartmentalization factor, the transmissibility index, and the depth factor, generating a geotechnical index for the petroleum reservoir;
generating an estimated ultimate recovery factor based at least in part on a plurality of reservoirs making use of reservoir management best practices and technology;
based at least in part on the geo-technical index and the estimated ultimate recovery factor, determining an estimated maximum recovery efficiency for the petroleum reservoir;
based at least in part on the reservoir management rating and the estimated maximum recovery efficiency for the petroleum reservoir, determining one or more key recovery obstacles impeding the petroleum reservoir from achieving the estimated maximum recovery efficiency;
identifying one or more field development opportunities addressing the one or more key recovery obstacles; and
implementing or assisting in implementing the one or more field development opportunities addressing at least one of the one or more key recovery obstacles, the one or more field development opportunities including manually or automatically adjusting operation of one or more production units selected from producing oil wells, water injection wells, gas injection wells, heat injectors, or sub-components thereof, and wherein adjusting the operation of the one or more production units is selected from change in volume, change in pressure, change in temperature, change in well bore path, drilling one or more new production units, implementing peripheral water flooding, re-activating an existing well, or shutting down one or more existing production units.

16. The method as in claim 15, further comprising implementing at least one of the one or more field development opportunities to increase the recovery efficiency of the petroleum reservoir.

17. A computer system comprising:
one or more processors; and
one or more computer-readable storage media having stored thereon computer-executable instructions that are executable by the one or more processors to cause the computer system to perform a petroleum recovery assessment for a petroleum reservoir by causing the computer system to perform at least the following:
evaluate results associated with a reservoir management effectiveness for the petroleum reservoir;
generate a reservoir management rating (RMP) based on the evaluated results associated with the reservoir management effectiveness;
evaluate results associated with a global benchmark analysis;
generate an estimated maximum recovery efficiency for the petroleum reservoir based on the evaluated results associated with the global benchmark analysis;
determine one or more key recovery obstacles impeding the petroleum reservoir from achieving the estimated maximum recovery efficiency based at least in part from the reservoir management score and the estimated maximum recovery efficiency; and
identify one or more field development opportunities addressing at least one of the one or more key recovery obstacles that when implemented, increase a recovery efficiency for the petroleum reservoir closer to the estimated maximum recovery efficiency; and
implement the one or more field development opportunities, the one or more field development opportunities including manually or automatically adjusting operation of one or more production units selected from producing oil wells, water injection wells, gas injection wells, heat injectors, or sub-components thereof, and wherein adjusting the operation of the one or more production units is selected from change in volume, change in pressure, change in temperature, change in well bore path, drilling one or more new production units, implementing peripheral water flooding, re-activating an existing well, or shutting down one or more existing production units.

18. The computer system as in claim 17, wherein the computer system further includes computer executable instructions that are executable to cause the computer system to perform the following:
display at a user interface one or more of: the results associated with a reservoir management analysis, the reservoir management rating (RMR), the results associated with a global benchmark analysis, the estimated maximum recovery efficiency, the one or more key recovery obstacles, and the one or more field development opportunities.

19. The computer system as in claim 18, wherein the at least one field development opportunity is automatically implemented by the computer system.

* * * * *

UNITED STATES PATENT AND TRADEMARK OFFICE
CERTIFICATE OF CORRECTION

PATENT NO. : 10,508,520 B2
APPLICATION NO. : 15/618399
DATED : December 17, 2019
INVENTOR(S) : Saleri et al.

Page 1 of 3

It is certified that error appears in the above-identified patent and that said Letters Patent is hereby corrected as shown below:

On the Title Page

Page 3
Item (56), References Cited, change, "Saleri et al., "Shaybah-220: A Maximum-Reservoir-Contact (MRC) Well and Its Implications for Developing Tight-Facies Reservoirs", SPE Reservoir Evaluation &." to –Saleri et al., "Shaybah-220: A Maximum-Reservoir-Contact (MRC) Well and Its Implications for Developing Tight-Facies Reservoirs", SPE Reservoir Evaluation & Engineering. 7 (04), April 2013.–

In the Drawings

Sheet 4, replace Fig. 4 with the attached replacement drawing where descriptions for reference numbers 408 and 409 have been changed In the Specification Column 1
Line 28, change "into myriad" to –into a myriad–

Column 4
Line 21, remove [an]

Column 9
Line 9, change "be physical" to –be a physical–

Column 16
Line 28, change "describe" to –described–
Line 44, change "describe" to –described–
Line 66, change "the" to –an–

Signed and Sealed this
Twelfth Day of January, 2021

Andrei Iancu
*Director of the United States Patent and Trademark Office*

Column 21
Line 34, change "workflow" to –workflows–

Column 22
Line 13, change "(step 405), determining" to –(step 405), and determining–

Column 25
Line 50, change "an" to –a–